(12) United States Patent
Stedron et al.

(10) Patent No.: US 7,752,453 B2
(45) Date of Patent: Jul. 6, 2010

(54) METHOD OF ENCRYPTING AND TRANSMITTING DATA AND SYSTEM FOR TRANSMITTING ENCRYPTED DATA

(75) Inventors: Robert Allen Stedron, Tucson, AZ (US); John L. Chmielewski, Lake Mary, FL (US)

(73) Assignee: Encryption Solutions, Inc., Santa Ana, CA (US)

( * ) Notice: Subject to any disclaimer, the term of this patent is extended or adjusted under 35 U.S.C. 154(b) by 1205 days.

(21) Appl. No.: 10/753,753

(22) Filed: Jan. 8, 2004

(65) Prior Publication Data
US 2005/0152538 A1 Jul. 14, 2005

(51) Int. Cl.
*G06F 9/00* (2006.01)

(52) U.S. Cl. .......................... 713/189; 380/42; 380/43; 380/35

(58) Field of Classification Search .................. 380/37, 380/42–43, 35, 36, 255–257, 277, 287, 45, 380/280, 269; 713/160, 189, 500; 726/13, 726/14

See application file for complete search history.

(56) References Cited

U.S. PATENT DOCUMENTS

| | | | | |
|---|---|---|---|---|
| 3,798,359 A | 3/1974 | Feistel | ........................ | 178/22 |
| 3,962,539 A | 6/1976 | Ebrsam et al. | ................ | 178/22 |
| 4,200,770 A | 4/1980 | Hellman et al. | ................ | 178/22 |
| 4,218,582 A | 8/1980 | Hellman et al. | ................ | 178/22 |
| 4,255,811 A | 3/1981 | Adler | ........................ | 380/37 |
| 4,322,577 A | 3/1982 | Brandstrom | ................ | 380/37 |
| RE30,957 E | 6/1982 | Feistel | ...................... | 380/262 |
| 4,405,829 A | 9/1983 | Rivest et al. | ............... | 178/22.1 |
| 4,520,232 A | 5/1985 | Wilson | ........................ | 380/28 |
| 4,607,137 A | 8/1986 | Jansen et al. | ................ | 380/277 |
| 4,646,290 A | 2/1987 | Hills | ........................ | 370/345 |
| 4,748,668 A | 5/1988 | Shamir et al. | ................ | 380/30 |
| 4,850,017 A | 7/1989 | Matyas, Jr. et al. | ............ | 380/21 |
| 5,038,376 A | 8/1991 | Mittenthal | ................ | 380/37 |
| 5,140,634 A | 8/1992 | Guillou et al. | ................ | 380/23 |
| 5,214,703 A | 5/1993 | Massey et al. | ................ | 380/37 |
| 5,231,668 A | 7/1993 | Kravitz | ........................ | 380/28 |
| 5,241,599 A | 8/1993 | Bellovin et al. | ............. | 713/171 |
| 5,315,658 A | 5/1994 | Micali | ........................ | 380/30 |

(Continued)

OTHER PUBLICATIONS

Bruce Schneier "Applied Cryptography", 1996, pp. 265-281.*

(Continued)

*Primary Examiner*—Thomas R Peeso
(74) *Attorney, Agent, or Firm*—Katten Muchin Rosenman LLP

(57) ABSTRACT

A method of encrypting and transmitting data and a system for transmitting encrypted data. The method includes one or more different encryption algorithms, and may include employing different encryption algorithms to achieve multiple levels of encryption. A first encryption algorithm is based upon multiple rearrangements of bits representing data to obtain encoded data. A second encryption algorithm is based upon performing multiple XOR operations on bits representing data so that each data word is at least encoded with previous data words. The system comprises first and second computers and a plurality of communication parameters. The two computers are communicably connected to a network, and the second computer is adapted to route a transmission to the first computer. The transmission includes a data part and a header part, both of which are encrypted by the second computer utilizing the communication parameters. The first computer decrypts the transmission utilizing the communication parameters.

46 Claims, 9 Drawing Sheets

U.S. PATENT DOCUMENTS

| | | | |
|---|---|---|---|
| 5,365,589 A | 11/1994 | Gutowitz | 380/43 |
| 5,541,995 A * | 7/1996 | Normile et al. | 380/42 |
| 5,604,801 A | 2/1997 | Dolan et al. | |
| 5,638,446 A | 6/1997 | Rubin | |
| 5,675,653 A | 10/1997 | Nelson, Jr. | 380/28 |
| 5,692,047 A | 11/1997 | McManis | |
| 5,778,074 A | 7/1998 | Garcken et al. | 380/37 |
| 5,799,089 A | 8/1998 | Kuhn et al. | 380/37 |
| 5,825,886 A | 10/1998 | Adams et al. | 380/28 |
| 5,889,966 A | 3/1999 | Sonobe | |
| 6,038,321 A | 3/2000 | Torigai et al. | 380/268 |
| 6,081,597 A | 6/2000 | Hoffstein et al. | 380/28 |
| 6,122,375 A | 9/2000 | Takaragi et al. | 380/28 |
| 6,125,182 A | 9/2000 | Saterfield | 380/28 |
| 6,154,840 A | 11/2000 | Pebly et al. | |
| 6,167,513 A | 12/2000 | Inoue et al. | |
| 6,167,516 A | 12/2000 | Camion et al. | |
| 6,182,216 B1 | 1/2001 | Luyster | 713/168 |
| 6,192,129 B1 | 2/2001 | Coppersmith et al. | 380/259 |
| 6,243,470 B1 | 6/2001 | Coppersmith et al. | 380/259 |
| 6,266,417 B1 | 7/2001 | Scheidt et al. | 380/255 |
| 6,269,164 B1 | 7/2001 | Pires | 380/42 |
| 6,304,657 B1 | 10/2001 | Yokota et al. | 380/28 |
| 6,381,331 B1 | 4/2002 | Kato | 380/37 |
| 6,460,137 B1 | 10/2002 | Akiyama et al. | 713/160 |
| 6,570,989 B1 | 5/2003 | Ohmori et al. | 380/42 |
| 6,598,161 B1 | 7/2003 | Kluttz et al. | |
| 6,675,225 B1 | 1/2004 | Genty et al. | |
| 6,751,319 B2 | 6/2004 | Luyster | 380/37 |
| 6,782,473 B1 | 8/2004 | Park | 713/160 |
| 6,820,198 B1 | 11/2004 | Ross | |
| 6,873,707 B1 * | 3/2005 | Batcher | 380/255 |
| 6,937,727 B2 * | 8/2005 | Yup et al. | 380/37 |
| 6,976,166 B2 | 12/2005 | Herley et al. | |
| 6,978,367 B1 | 12/2005 | Hind et al. | |
| 7,010,681 B1 | 3/2006 | Fletcher et al. | |
| 7,103,772 B2 | 9/2006 | Jorgensen et al. | |
| 7,143,289 B2 | 11/2006 | Denning et al. | |
| 7,200,230 B2 | 4/2007 | Knauft | |
| 7,200,760 B2 | 4/2007 | Riebe et al. | |
| 2001/0014154 A1 | 8/2001 | Aikawa et al. | 380/37 |
| 2001/0039579 A1 | 11/2001 | Trcka et al. | 709/224 |
| 2002/0023143 A1 | 2/2002 | Stephenson et al. | 709/218 |
| 2002/0025040 A1 | 2/2002 | Stein | 380/47 |
| 2002/0031219 A1 | 3/2002 | Gutsche et al. | 380/28 |
| 2002/0073336 A1 | 6/2002 | Toy et al. | |
| 2002/0198345 A1 | 12/2002 | Grootaert et al. | 526/247 |
| 2003/0076955 A1 | 4/2003 | Alve et al. | |
| 2003/0223580 A1 | 12/2003 | Snell | 380/28 |
| 2003/0235298 A1 | 12/2003 | Hanounik | 380/29 |
| 2004/0120519 A1 | 6/2004 | Joye et al. | 380/30 |
| 2004/0153642 A1 | 8/2004 | Plotkin et al. | |
| 2004/0168081 A1 | 8/2004 | Ladas et al. | |
| 2005/0091499 A1 | 4/2005 | Forlenza et al. | |
| 2005/0154795 A1 | 7/2005 | Kuz et al. | |
| 2005/0192904 A1 | 9/2005 | Candelore | |
| 2005/0235163 A1 | 10/2005 | Forlenza et al. | |
| 2005/0235165 A1 | 10/2005 | Gomez et al. | |
| 2005/0246526 A1 | 11/2005 | Forlenza et al. | |

OTHER PUBLICATIONS

Web pages from http://www.ssh.com/crypotography/introduction and selected linked pages, as printed on Oct. 2, 2003.

* cited by examiner

Reference Table

| | | | | | | | | | | | |
|---|---|---|---|---|---|---|---|---|---|---|---|
| Row A1 | 2 | 12 | 0 | 17 | 27 | 7 | 22 | 3 | 15 | 12 | 6 | ... | 15 |
| Row B1 | 21 | 18 | 24 | 9 | 30 | 27 | 0 | 15 | 3 | 9 | 21 | ... | 21 |
| Row B3 | 12 | 24 | 6 | 30 | 27 | 0 | 18 | 9 | 30 | 3 | 0 | ... | 6 |
| . | 18 | 24 | 12 | 21 | 6 | 15 | 27 | 30 | 21 | 15 | 3 | ... | 0 |
| . | 0 | 6 | 24 | 27 | 18 | 9 | 12 | 9 | 30 | 12 | 21 | ... | . |
| . | 27 | 0 | 24 | 3 | 18 | 6 | 15 | 18 | 15 | 3 | 0 | ... | . |
| . | 30 | 27 | 6 | 9 | 21 | 24 | 12 | 6 | 0 | 15 | 21 | ... | . |
| . | 9 | 18 | 27 | 24 | 3 | 30 | 12 | 9 | 3 | 6 | 24 | ... | . |
| . | 27 | 12 | 21 | 30 | 18 | 15 | 0 | 15 | 0 | 6 | 30 | ... | . |
| . | 9 | 18 | 3 | 21 | 24 | 27 | 12 | 18 | 15 | 0 | 9 | ... | . |
| . | 6 | 12 | 30 | 24 | 3 | 21 | 27 | . | . | . | . | ... | . |
| . | . | . | . | . | . | . | . | . | . | . | . | ... | . |
| . | . | . | . | . | . | . | . | . | . | . | . | ... | . |
| Row Br | 9 | 18 | 30 | 24 | 27 | 12 | 3 | 0 | 6 | 21 | 15 |

FIG. 2

| Routing | Header H1 | Data | FIG. 9A |

| Routing | Header H2 | Header H1 | Data | FIG. 9B |

| Routing | Header H3 | Header H2 | Header H1 | Data | FIG. 9C |

| Routing | Header H4 | Header H2 | Header H1 | Data | FIG. 9D |

METHOD OF ENCRYPTING AND TRANSMITTING DATA AND SYSTEM FOR TRANSMITTING ENCRYPTED DATA

BACKGROUND OF THE INVENTION

1. Field of the Invention

The field of the present invention is cryptography.

2. Background

The science of cryptography has existed for thousands of years, but it is only within the last one hundred or so years that cryptography has become important to the general public. First with the telegraph, then with radio and telephone communications, and now in the information age that is typified by electronic communications over the Internet and computer networks of all kinds, both wired and wireless.

Given the long history of cryptography, many methods are available for generating cipher text (the terms cipher text, encrypted information, encrypted data, and encrypted transmission are used interchangeably herein) from plain text (similarly, the terms plain text, unencrypted information, unencrypted data, and unencrypted transmission are used interchangeably herein), ranging from the simple to the very complex. Regardless of the complexity of any individual cipher system, all seek to encode plain text as cipher text to prevent access to the encoded data or message by unauthorized parties (the terms encode and encrypt are used synonymously herein, as are the terms decode and decrypt).

Two common approaches to cryptography are found in U.S. Pat. No. 3,962,539 to Ehrsam et al., entitled "Product Block Cipher System For Data Security", and in U.S. Pat. No. 4,405,829 to Rivest et al., entitled "Cryptographic Communications System and Method". The Ehrsam patent discloses what is commonly known as the Data Encryption Standard (DES), while the Rivest patent discloses what is commonly known as the RSA algorithm.

DES is based upon secret-key cryptography, also referred to as symmetric cryptography, and relies upon a 56 bit key for encryption. In this form of cryptography, the sender and receiver of cipher text both possess identical secret keys, which are, in an ideal world, completely unique and unknown to the world outside of the sender and receiver. By encoding plain text into cipher text using the secret key, the sender may send the cipher text to the receiver using any available public or otherwise insecure communication system. The receiver, having received the cipher text, decrypts it using the secret key to arrive at the plain text.

The security of data encrypted using DES depends largely upon the length of the secret key and, as alluded to previously, the secrecy of the secret key. DES encryption, as originally devised, utilized a 56 bit key. With the processing power of desktop computers ever increasing, the difficulty of divining a secret key from cipher text is rapidly decreasing. DES encryption, therefore, is a less secure form of cryptography than it was five years ago.

One solution that has been implemented to resolve the security issue surrounding DES is to encrypt data two or more successive times using the DES algorithm. Each successive level of encryption may use the same or different DES keys. If different keys are employed, careful selection of the keys is important as some key combinations actually result in a less secure encryption than encryption using a single 56 bit key. This method of encryption, however, has been primarily employed as a stop-gap measure until the Advanced Encryption Standard (AES), which supports keys up to 256 bits in length and utilizes a different encryption algorithm, becomes more widely employed.

RSA encryption is based upon public-key cryptography. Two asymmetric keys are generated using two large prime numbers and a predefined mathematical relationship. The first key is kept private to a recipient, and the second key is made available to those who send data to the recipient. The mathematical relationship between the public and private keys enables the recipient of data encrypted with the public key to decrypt that data using the private key. The security of RSA is based upon the difficulty of factoring a very large number to discover the private key.

A commercial implementation of RSA is available from PGP Corporation of Palo Alto, Calif., and open source implementations are available at http://www.pgpi.org and http://www.gnupg.org (collectively, these RSA implementations are referred to herein as "PGP encryption").

SUMMARY OF THE INVENTION

The present invention is directed toward a method of encrypting and transmitting data and a system for transmitting encrypted data. The method of encrypting data includes applying one or more encryption algorithms to data. Data may be encrypted using any one of the disclosed encryption algorithms singly, in combination with each other, or in combination with any other encryption algorithm. The method of transmitting data builds upon the disclosed methods of encrypting data by incorporating source identifiers into the encryption process. The source identifiers may be incorporated into data encrypted for transmission or utilized as part of the encryption process prior to transmission. The methods of encrypting and transmitting data may be modified in such a way so as to enable the encryption of successive data packets The system for transmitting encrypted data comprises first and second computers and a plurality of communication parameters. The computers are communicably connected over a network for routing transmissions therebetween. The computers employ the communication parameters for encrypting the transmissions. The communication parameters include at least one encryption algorithm identifier which indicates an encryption algorithm to be used for encrypting and decrypting a transmission.

In a first separate aspect of the present invention, the method of encrypting data includes representing data in binary format and dividing it into words of equal length. The bits of each word are rearranged twice utilizing a reference table which renders the rearrangements reversible. Optionally, the first rearrangement is performed in a different manner as compared to the second rearrangement. The reference table may be constructed to include a first row having m entries and r rows of n entries each, m, n, and r being real numbers. One method of performing the rearrangements with such a table is to reversibly rearrange the bits of each word a first time utilizing the first row of the reference table, then reversibly rearrange the bits of each word a second time utilizing one of the successive r rows of the reference table. A different one of the r rows may be utilized for successive words of the data.

In a second separate aspect of the present invention, the method of encrypting data includes representing data in binary format and dividing it into words of equal length. An exclusive OR (XOR) operation is performed on a first word of the data utilizing a key and a first word from a noise table. The key is represented in binary format and has a word of the same length as the data words. The noise table is also represented in binary format and divided into words of the same length as the data words. The XOR operation is performed on each successive data word utilizing the result from the immediately previous XOR operation and the noise table word subsequent to the last noise table word used. The noise table may be generated at any time prior to encrypting the data, and the more random the noise table is, the less recognizable the data will be in its encrypted form.

In a third separate aspect of the present invention, the method of transmitting data builds upon the aforementioned second separate aspect. Data is represented in binary format and divided it into words of equal length. A time and date indicator, a message number, and a port offset indicator are generated, each being represented in binary format having a word of equal length to the words of the data. The first word of the data is generated by combining the time and date indicator, the message number, and the port offset indicator using an XOR operation. This first word is encrypted with a key and a first word of a noise table using an XOR operation. Successive data words are encrypted with the result of the immediately previous XOR operation and the noise table word subsequent to the last noise table word used. In the preferred embodiment, the time and date indicator is the time and date of the transmission, the message number is a sequential message identifier, and the port offset indicator is the difference between the port the transmission is sent to and one of a plurality of pre-determined ports.

In a fourth separate aspect of the present invention, the method of transmitting data builds upon the aforementioned second separate aspect to enable the transmission of encrypted data in discrete packets. Data is represented in binary format and divided into words of equal length and then further divided into packets of appropriate sizes. The first packet is encrypted as described for the second separate aspect. After the first packet is prepared for transmission, an XOR operation is performed on the first word of the second packet using the result from the XOR operation of the last word of the first packet. An XOR operation is performed on successive words of the second packet utilizing the result of an immediately previous XOR operation. Each packet may be transmitted after being encrypted. Additional packets may be prepared and transmitted in the same manner.

In a fifth separate aspect of the present invention, the communication parameters include at least a message number, an encryption algorithm identifier, a first encryption key, and a second encryption key. Both the first and second encryption keys are two part keys, each having a private key part and a public key part. The second computer generates a transmission having at least two parts, the first part being a data part and the second part being a header part. The second computer is adapted to utilize the encryption algorithm identifier, the public key part of the first key, and the message number to encrypt the data part and to utilize the encryption algorithm identifier and the public key part of the second key to encrypt the header part. In compliment, the first computer is adapted to utilize the encryption algorithm identifier and the private key part of the second key to decrypt the header part and to utilize the encryption algorithm identifier, the private key part of the first key, and the message number to decrypt the data part. Additional communication parameters may be included for encrypting and decrypting the transmission.

While each of the foregoing aspects of the invention may be employed independently of the other aspects, in a sixth separate aspect of the present invention, any of the aspects may be employed in combination.

Accordingly, it is an object of the present invention to provide an improved method of encrypting and transmitting data and an improved system for transmitting encrypted data. Other objects and advantages will appear hereinafter.

BRIEF DESCRIPTION OF THE DRAWINGS

In the drawings, wherein like reference numerals refer to similar components:

FIG. 2 illustrates a sample reference table utilized in the encryption method of FIG. 1;

FIGS. 9A-9D schematically illustrate encrypted data transmissions generated using the method of FIG. 4;

DETAILED DESCRIPTION OF THE PREFERRED EMBODIMENTS

1. Encryption by Bit-Shifting

Figure 1:
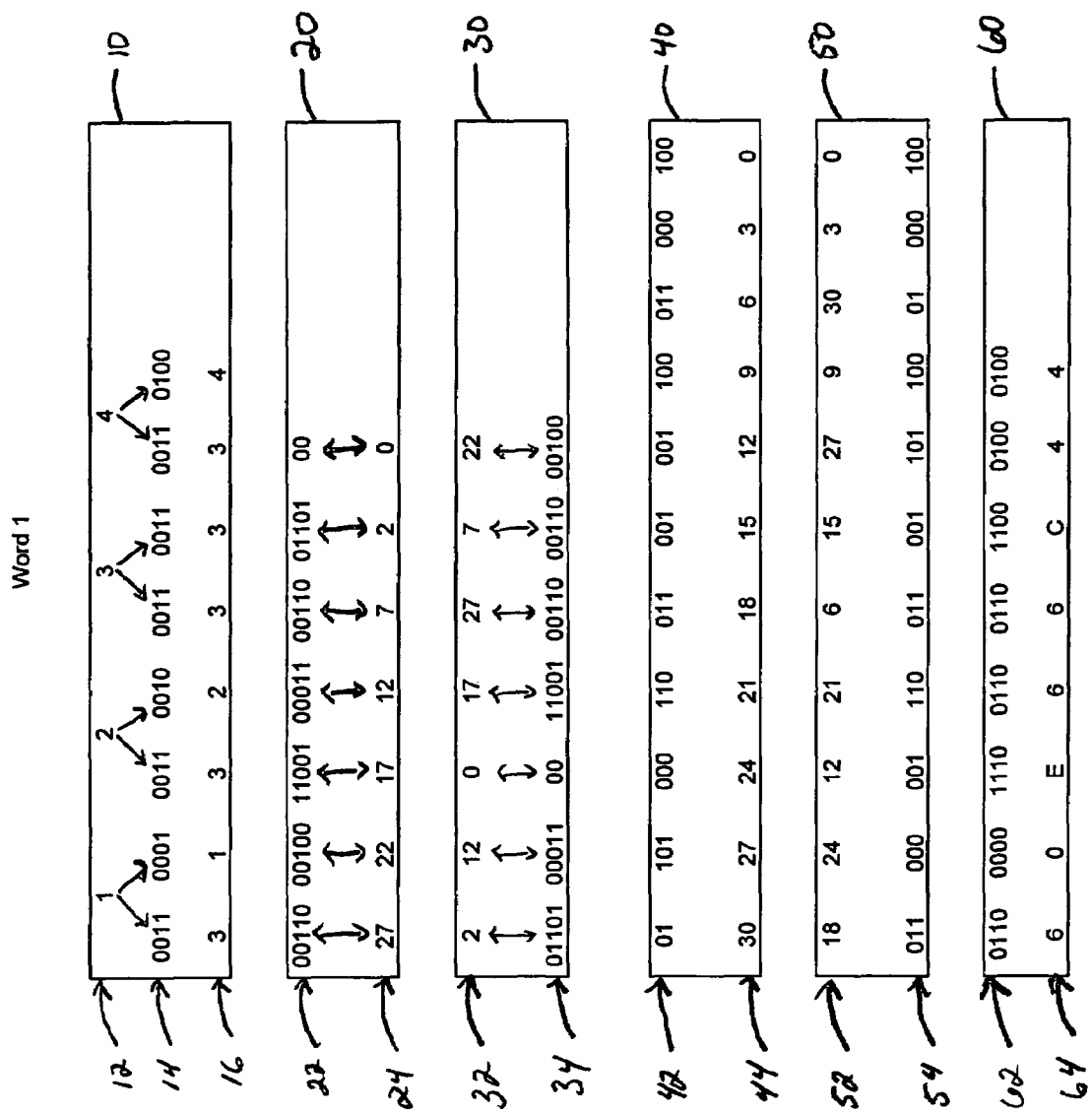
FIG. 1 illustrates a first method of encrypting data.

Turning in detail to the drawings, FIG. 1 illustrates by way of example a first method of encrypting data. The data used in this example is simplified to the string "1234" in ASCII format. The first block 10 shows the data represented in three different formats. In the first line 12, the data is in ASCII format, in the next line 14 the data is in binary format, and in the last line 16 the data is in HEX format 16. Thus, in binary format the sample data is a single word of 32 bits in length. For data having more than 32 bits when represented in binary format, the data is divided into words of 32 bits in length, and each word is likewise processed.

Throughout the methods and systems described herein, data is divided into 32 bit words for ease of explanation and processing. However, the word length may vary as desired. Those skilled in the art will recognize that the methods and systems of encrypting data and data transmissions described herein may be changed accordingly to process data having any chosen word length.

In the second block 20 of FIG. 1, the first line 22 shows the data in binary format grouped in six groups of five bits and a last group of two bits, for a total of seven groups. The second line 24 represents the entries in row A1 from the reference table of FIG. 2 ordered from largest to smallest. Any other easily reproducible order may be employed. Each group of bits in the first line 22 is correlated with one of the ordered row $A_1$ entries in the second line 24: the first group of bits is correlated with the largest entry of row $A_1$, the second group of bits is correlated with the next largest entry of row $A_1$, and so on until the last group of bits is correlated with the smallest entry of row $A_1$. In the third block 30, the first line 32 shows the table entries rearranged into the order they appear in row $A_1$ of the table, and the second line 34 shows the groups of bits likewise rearranged according to the correlation between each group of bits and each entry of row $A_1$.

This first rearrangement of the data word is reversible simply by reference to row A1 of the same reference table. The second and third blocks 20, 30 thus illustrate by example how to perform the first reversible rearrangement of the data word. While the data word is grouped into seven groups of bits, more or fewer groups may be employed as desired, keeping the number of groups equal to the number of entries in row $A_1$ of the reference table. The number of bits in each group may also vary as desired. Preferably, if the data word is divided into m groups of bits, there will be m-1 groups having p bits and one group having q bits, wherein q is less than p and p and q are prime numbers.

In the fourth block 40, the first line 42 shows the once-rearranged bits grouped into a first group of two bits and ten groups of three bits, for a total of eleven groups. The second line 44 represents the entries in row $B_3$ from the reference table of FIG. 2 ordered from largest to smallest. Any other easily reproducible order may be employed. The entries from any one of the rows $B_1$ through $B_r$ may be selected for use in this rearrangement. Selection of a particular row is discussed in further detail below. Each group of bits in the first line 42 is correlated with one of the ordered row $B_3$ entries in the second line 44: the first group of bits is correlated with the largest entry of row $A1$, the second group of bits is correlated with the next largest entry of row $B_3$, and so on until the last group of bits is correlated with the smallest entry of row $B_3$. In the fifth block 50, the first line 52 shows the table entries rearranged into the order they appear in row $B_3$ of the table, and the second line 54 shows the groups of bits likewise rearranged to according to the correlation between each group of bits and each entry of row $B_3$.

Like the first rearrangement, this second rearrangement of the data word is reversible simply by reference to the appropriate row, in this case row $B_3$, of the same reference table. The fourth and fifth blocks 40, 50 thus illustrate by example how to perform the second reversible rearrangement of the data word. While the bits are grouped into eleven groups of bits, more or fewer groups may be employed as desired, keeping the number of groups equal to the number of entries in the $B_r$ rows of the reference table. The number of bits in each group may also vary as desired. Preferably, if the bits are grouped into m groups of bits, there will be m-1 groups having p bits and one group having q bits, wherein q is less than p and p and q are whole positive numbers.

The last block 60 of FIG. 1 shows the result of the two reversible rearrangement processes. The first line 62 represents the bits in the last line 54 of block 50 grouped into eight groups of four bits each. Each group of the first line 62 is represented in HEX format in the second line 64. A comparison of the last line 16 of the first block 10 with the last line 64 of the last block 60 illustrates that the data word is now in an unrecognizable form.

When encrypting data which has multiple data words, successive rows of the $B_r$ rows are employed for each successive data word. Preferably, the reference table includes 11 of the $B_r$ rows for encrypting such data. The first of the $B_r$ rows may be selected at random, or by some other appropriate method, when encrypting the first word of the data. The next successive row of the $B_r$ rows is employed to encrypt the next word of the data. If the last of the $B_r$ rows is reached, the next data word is encrypted utilizing the first of the $B_r$ rows, proceeding in this manner until all data words are encrypted.

As indicated, the reference table of FIG. 2 has a first row $A_1$ of seven entries and a plurality of rows $B_r$ of eleven entries each. The number of entries in row $A_1$ may vary, as more or fewer entries may be employed as desired. Preferably, the number of entries in row $A_1$ is prime. Each entry in row $A_1$ may be populated with any value, with the limitation that each entry is unique within the row. The number of rows r may similarly vary as desired. Preferably, the number of entries in each of the rows $B_r$ is prime. When encrypting data, eleven rows are preferred. Similarly, the number of entries in each of the rows $B_r$ may vary with each of the rows $B_r$ having the same number of entries, as more or fewer entries may be employed as desired. The entries in each of the rows $B_r$ may also be populated with any value, with the limitation that each entry is unique within its row.

2. Encryption by XOR Operations

Figure 3:
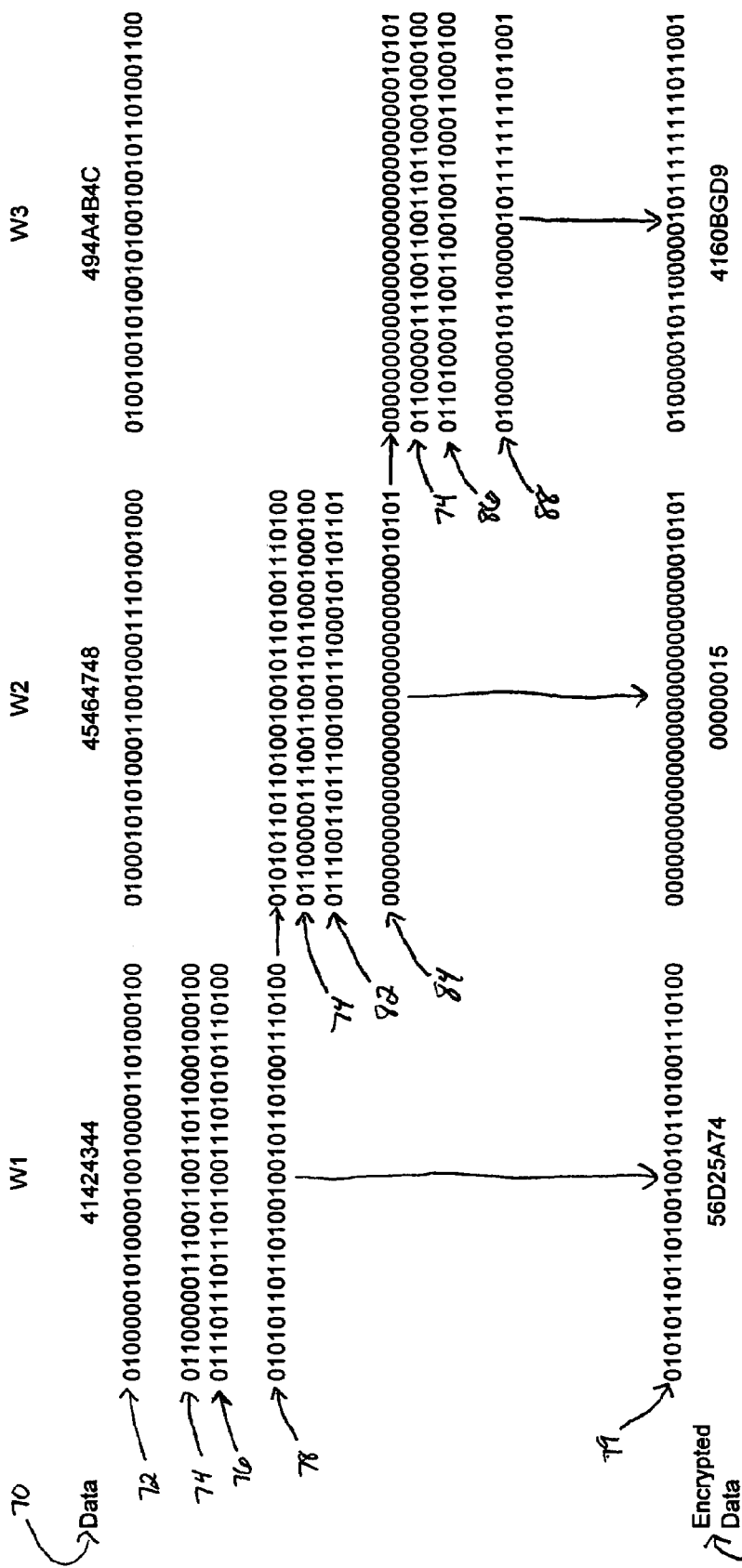
FIG. 3 illustrates a second method of encrypting data.

FIG. 3 illustrates by way of example a second method of encrypting data using the exclusive OR (XOR) operation. The data 70 used in this example is divided into three words $W_1$-$W_3$ such that when the words are represented in binary format 72, each word is 32 bits long. A series of XOR operations are performed on each data word. The encrypted data 80 is the result of the series of XOR operations. The first encrypted data word 78 is the result of the first data word $W_1$ XOR the key 74 XOR the first word 76 of a noise table. Like the data words, the key 74 and the noise table are represented in binary format. The key 74 preferably has a single word that is 32 bits long, although other word lengths may be employed. The noise table, like the data, includes multiple words, each being 32 bits in length, and is described in greater detail below. The second encrypted data word 84 is the result of the second data word $W_2$ XOR the first encrypted data word 78 XOR the key 74 XOR the second word 82 of the noise table. Similarly, the third encrypted data word 88 is the result of the third data word $W_3$ XOR the second encrypted data word 84 XOR the key 74 XOR the third word 86 of the noise table. The first encrypted data word is thus the result of two successive XOR operations and all encrypted data words following the first are the result of three successive XOR operations. Data of any size may thus be encrypted using this process.

Decryption of data encrypted in this manner is achieved using a similar process. Access to at least the noise table, and possibly the key, may be required for decryption. A method of encrypting data that does not require access to the key used for encryption is discussed in greater detail below. As for the example of FIG. 3, both the noise table and the key are required for decryption. By way of example, the first encrypted data word 78 is decrypted by applying successive XOR operations using the key 74 and the first word 76 of the noise table. The order in which the XOR operations is performed is irrelevant. The second encrypted data word 84 is decrypted by applying successive XOR operations using the first encrypted data word 78, the key 74, and the first word 76 of the noise table. The third encrypted data word 88 is similarly decrypted. The result of this process will yield the data in decrypted form.

The noise table referred to previously is a data file which includes random data bits and does not include discernable repetition or patterns within the data structure. Many methods of creating such a file are known to those of skill in the art; the following description is therefore simply one method among many that may be employed. Three components are employed to create the noise table: a large data file, preferably in excess of 1 Megabyte, which includes few, if any, repetitive phrases or data strings; a reference table as shown in FIG. 2 having one row of seven entries and 127 rows of eleven entries each; and a random number generator, such as the standard random number generator that is included with most modern operating systems.

The random number generator is employed to generate a table having a predetermined size of at least 128 bytes. The table is preferably 64 kilobytes in size, but may be larger, and is preferably generated one byte at a time. The random number generator is further employed to determine a starting point within the large data file and within the $B_r$ rows of the reference table. From the starting point within the large data file, the bit-shifting process described in connection with FIG. 1 is applied to data within the large data file using the reference table. An XOR operation is performed on each bit-shifted word of the large data file using the randomly generated table. This process continues for the entire length of the randomly generated table and results in generation of the noise table. Preferably, the noise table is constructed as a 64 kilobyte file.

A noise table generated in this manner may be used for the encryption process described in connection with FIG. 3 or as further described below. Any word within the noise table may be chosen as the first noise table word 76. If the end of the noise table is encountered at any time during the encryption process, the noise table is used in a cyclical manner, with the first noise table word succeeding the last noise table word.

3. Establishing Communication Parameters

Figure 4:
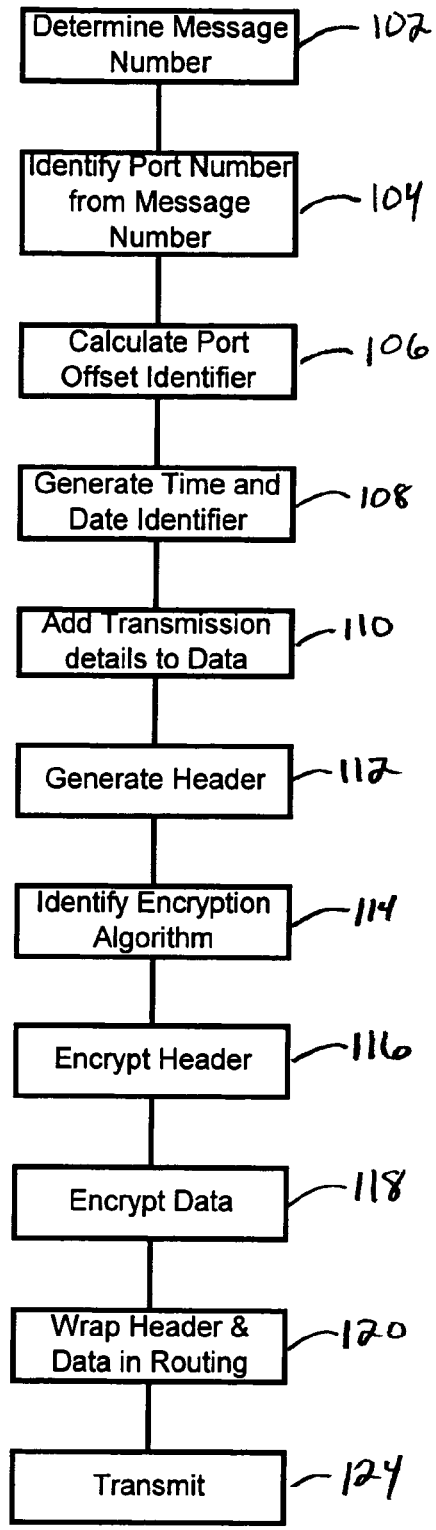
FIG. 4 is a flow chart illustrating a method of generating an encrypted transmission.

The flow chart of FIG. 4 shows the high level process for generating and transmitting encrypted data. Those skilled in the art will recognize that many of the steps shown in FIG. 4 may be performed in an order different from that shown. For example, steps 102 and 108 may take place at any point prior to steps 110 and 112, steps 110 and 112 are interchangeable, step 114 may take place at any point prior to steps 116 and 118, and steps 116 and 118 are interchangeable. Thus, many permutations of the order in which the process is performed are possible.

At some time prior to transmission the communication parameters are established. Certain communication parameters are preferably established by the recipient of the transmission, while certain others are preferably established by the sender of the transmission. Alternatively, the communication parameters may be established by any party, whether the sender or recipient of the transmission or not, so long as the appropriate communication parameters are communicated to both the sender and recipient. Some of the communication parameters are intended to remain private to a specific sender of the transmission, the recipient, or both. Some of the communication parameters are made available to more than one sender for communication with the recipient, rendering such communication parameters either public or semi-public, depending upon the scope of dissemination.

Among the communication parameters that are preferably established by the recipient are as follows:

An initial message number. The initial message number is a randomly selected 32 bit positive number. Once generated, the sender is provided with the initial message number. The first transmission sent by the sender is marked with the initial message number. After each transmission, the message number is incremented and the sender marks each subsequent transmission with the current message number. The message number is used in a cyclic manner, such that when the last message number is used, the next message number used is 0. The recipient maintains record of the current message number and may use this information to verify the authenticity of any message purporting to be from the sender.

A list of eight network port numbers. The eight network ports are selected randomly, or by any other appropriate method, and labeled as ports 0-7. Each port is represented in binary format as a 32 bit word. The list of network ports maintained by both the sender and recipient.

At least one private reference table. The private reference tables are of the type illustrated in FIG. 2 If more than one private reference table is utilized, then preferably there are a prime number of private reference tables. Further, each private reference table preferably includes a prime number of entries in the first row, a prime number of subsequent rows, and a prime number of entries in each subsequent row. More preferably, each private reference table has a first row of seven entries and eleven subsequent rows of eleven entries each. Each private reference table need not have the same number of rows or the same number of entries in the first row or in the subsequent rows. The entries are populated with numbers in the manner previously described. Both the sender and the recipient maintain the private reference tables for encoding and decoding transmissions, respectively. All private reference tables are preferably maintained in an encoded format and are decoded at the time of use. Any reversible encoding method may be used. In the preferred encoding method, the CPU of the computer which maintains the tables is polled for its serial number and specification information, which may include processor type, speed, and manufacturer, among other things. The polled information is serially combined and represented in binary format in a chosen word length. Each table is similarly represented in binary format having the same word length. The first word of the of the tables is encoded with the first word of the polled information using an XOR operation. The second word of the tables is encoded with the second word of the polled information and the encoded first word using XOR operations. The third word of the tables is encoded with the second word of the polled information and the encoded second word using XOR operations. This process continues over the entire table. If the end of the polled information is reached before the end of the table, then each subsequent word of the table is encoded with the immediately previous encoded word using an XOR operation.

At least one semi-public (or public) reference table. The semi-public reference tables are of the type illustrated in FIG. 2. If more than one semi-public reference table is utilized, then preferably there are a prime number of semi-public reference tables. Further, each semi-public reference table preferably includes a prime number of entries in the first row, a prime number of subsequent rows, and a prime number of entries in each subsequent row. More preferably, each semi-public reference table has a first row of seven entries and eleven subsequent rows of eleven entries each. Each semi-public reference table need not have the same number of rows or the same number of entries in the first row or in the subsequent rows. The entries are populated with numbers in the manner previously described. Both the sender and the recipient maintain the semi-public reference tables for encoding and decoding transmissions, respectively. The semi-public references table may be more widely disseminated amongst the public. All semi-public reference tables are preferably maintained in an encoded format and are decoded at the time of use. Any reversible encoding method may be used. The preferred method of encoding is that previously described in connection with the private reference tables.

First and second private noise table keys. Each of these two keys is 32 bits in length. Both keys are generated by a standard random number generator. These keys, in conjunction with the private noise table, are used by the sender and the recipient for encoding and decoding transmissions, respectively. The sender is provided with and maintains the first private noise table key (the sender's private noise table key). The recipient maintains the second private noise table key (the recipient's private noise table key).

A private noise table. The private noise table is generated in the manner previously described. The sender maintains the private noise table in a simplified encoded format. The sender's format is generated by performing an XOR operation on each 32 bit word of the noise table using the first private noise table key. The recipient also maintains the private noise table in a simplified encoded format. The recipient's format is generated by performing an XOR operation on each 32 bit word of the noise table using the second private noise table key. Preferably, neither the sender nor the recipient maintains a decoded version of the private noise table, thus maintaining the privacy of the private noise table. The private noise table is preferably maintained in an encoded format and decoded at the time of use. Any reversible encoding method may be used. The preferred method of encoding is that previously described in connection with the private reference tables.

A semi-public (or public) noise table key. The semi-public noise table key is 32 bits in length and is generated by a standard random number generator. This key is provided to and maintained by the sender and is used in conjunction with the semi-public noise table to encrypt a transmission to the recipient. This key may be more widely disseminated amongst the public.

A third private noise table key. The third private noise table key is 32 bits in length and is generated by a standard random number generator. This key is maintained private by the recipient and is used in conjunction with the semi-public noise table to decrypt a transmission encoded using the semi-public noise table key and the semi-public noise table.

A semi-public (or public) noise table. This noise table is also generated in the manner previously described. As with the private noise table, the sender maintains the semi-public noise table in a simplified encoded format. The sender's format is generated by performing XOR operations using the semi-public noise table key on each 32 bit word of the semi-public noise table. The recipient also maintains the semi-public noise table in a simplified encoded format. The recipient's format is generated by performing XOR operations using the third private noise table key on each 32 bit word of the semi-public noise table. Preferably, neither the sender nor the recipient maintains a decoded version of the semi-public noise table. This semi-public noise table may be more widely disseminated amongst the public. The semi-public noise table is preferably maintained in an encoded format and decoded at the time of use. Any reversible encoding method may be used. The preferred method of encoding is that previously described in connection with the private reference tables.

At least one compression algorithm identifier. Any lossless compression algorithm may be identified for use. The transmission process described below may employ more than one compression algorithm, and if more than one is employed, the compression algorithm identifier also identifies where in the transmission process each identified compression algorithm is used. Both the sender and the recipient maintain the compression algorithm identifier.

First and second encryption keys. Both of these encryption keys are two-part encryption keys. The first encryption key is a private key and includes a first key part and a second key part. The first key part of the first encryption key is provided to and maintained by the sender for use in encoding transmissions, and the second key part of the first encryption key is maintained by the recipient for use in decoding transmissions. If DES, AES, or another similar encryption algorithm is employed, the first and second key parts of the first encryption key may be identical. The second encryption key is at least a semi-public key and also includes a first key part and a second key part. The first key part of the second encryption key is provided to and maintained by the sender for use in encoding transmissions. The first key part of the second encryption key may be more widely disseminated amongst the public. The second key part of the second encryption key is maintained by the recipient for use in decoding transmissions. Preferably, the first and second keys enable 128 bit PGP encryption. Optionally, these keys may be based upon biometric information provided by the respective party.

At least one encryption algorithm identifier. Any known encryption algorithm may be identified for use. The preferred encryption algorithm is PGP encryption. The transmission process described below may employ more than one encryption algorithm, and if more than one is employed, the encryption algorithm identifier also identifies where in the transmission process each identified encryption algorithm is used. Both the sender and the recipient maintain record of the encryption algorithm identifier. The sender employs the first key part and the third key part to encrypt the transmission using the identified encryption algorithm(s) and the recipient employs the second key part and the fourth key part to decrypt the transmission using the same algorithm(s).

Other communication parameters are preferably established by the sender of the transmission, including:

A network port identifier. The network port identifier indicates the network port of the intended recipient to which the transmission is sent. The network port identifier may be selected randomly as any one of the intended recipient's network ports, or it may be dictated by the network protocol utilized for the transmission. For network communications, the IEEE v.108 standard, available through the IEEE Operations Center in Piscataway, N.J., is preferably employed.

A port offset identifier. This parameter is calculated as the difference between the network port identifier and one of the network ports among the eight network port numbers. The port offset identifier is represented in binary format as a 32 bit word.

A date and time identifier. This parameter represents the date and time of encryption, which may also be the date and time of transmission. Like the port offset identifier, the date and time identifier is represented in binary format as a 32 bit word.

A date and time stamp. This parameter represents the date and time the transmission is sent. It may optionally be the same as the date and time identifier.

4. Transmitting Encrypted Data

Returning to FIG. 4, the sender initially prepares information which is to be included in the transmission. This information assists the recipient in decoding parts of the transmission and in authenticating the transmission as having originated from the sender. The first step (102) in preparing a transmission is determining the message number of the transmission. The least three significant digits of the message number in binary format are used to identify (104) one of the port numbers from the list of port numbers. The network port identifier is selected randomly, and the port offset identifier is calculated (106) therefrom using the list of network ports. Finally, the sender generates (108) the date and time identifier for the transmission.

As transmitted from the sender, the transmission includes a data part and a header part. The data part includes the substance of the transmission, while the header part includes identifiers and routing information. After the message number, the port offset identifier, and the time and date identifier have been prepared, they are added to both the data part of the transmission. The date and time stamp, if different from the date and time identifier, is also added to the data part, as is the identity of the sender. The identity of the recipient may also be added to the data part. The header part of the transmission is created (112) to include the identity of the sender, the message number, the date and time identifier, the port offset identifier, and the date and time of the transmission, if different from the date and time identifier.

Each item added to the data part serves to assist the recipient in authenticating the transmission. For example, the time and date identifier and the message number in the header part should match the time and date identifier and the message number in the data part if the transmission is authentic. The identity of the sender combined with the port to which the transmission was received may also serve to authenticate the transmission. Authentication via these identifiers is discussed further below.

Figure 5:
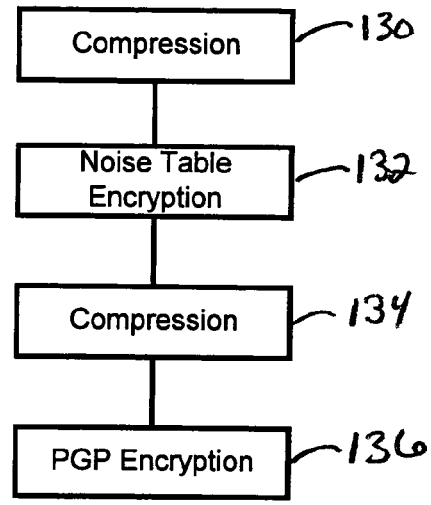
FIG. 5 is a flow chart illustrating a third method encrypting data.

After creating (112) the header part, the encryption algorithm(s) that are to be employed are identified (114) from the communication parameters. Encryption of the header part (116) and the data part (118) proceeds as shown in FIG. 5, each part being encrypted separately. Initially, each part is compressed (130) using the identified compression algorithm. Different compression algorithms may be used for the two parts of the transmission. Next, each part is encrypted (132). Preferably, encryption is accomplished using a noise table as described in connection with FIG. 3, although other methods of encryption may also be employed. The header part is encrypted (132) with the semi-public noise table key and the semi-public noise table, while the data part is encrypted (132) with the private noise table key and the private noise table.

Encryption (132) of the data part with the noise table includes encryption by bit-shifting, as described in connection with FIGS. 1 and 2, using a private reference table. Where the communication parameters comprise more than one private reference table, the private reference tables are assigned consecutive ordinal numbers, the first private reference table being assigned zero. The reference table used is selected based upon the remainder of (message number)/(number of reference tables).

The method of selecting which of multiple reference tables to use may vary, but selection is preferably based upon one or more of the communication parameters.

Once the private reference table is chosen, the first word of the data part is bit-shifted using the first row of the private reference table followed by one of the subsequent rows of the private reference table. The one of the subsequent rows of the private reference table is selected based upon the remainder of:

(time and date identifier+network port identifier+ 13*message number)/(number of subsequent rows).

Subsequent data words are bit-shifted using the first row of the private reference table followed by one of the subsequent rows of the private reference table, the subsequent rows being used in a cyclic manner. The method of selecting the row of the private reference table for use in bit-shifting the first word may vary, but selection is preferably based upon one or more of the communication parameters.

Encryption (132) of the header part with the noise table includes encryption by bit-shifting using the semi-public reference table in the manner previously described. Where multiple semi-public reference tables are employed, selection of the semi-public reference table for encoding the header part is performed in the same manner described in association with the private reference tables, although other selection methods may be employed. Selection of the initial row of the subsequent rows of the semi-public reference table, for bit-shifting the first word of the header part, is also performed in the manner previously described in connection with the private reference table, although other methods of selecting the row of the semi-public reference table may be employed.

After this first encryption step (132), each part of the transmission is again compressed (134) using the identified compression algorithm. As with the previous compression, different compression algorithms may be used for the two parts of the transmission. Finally, each part is encrypted (136) using PGP encryption, with the data part being encrypted using the first private key and the header part being encrypted using the first semi-public key. Other encryption algorithms may be used in lieu of PGP encryption for this encryption step. Further, different encryption algorithms may be used for the two parts of the transmission.

Returning to FIG. 4, after both the data part and the header part have been encrypted, the two parts are wrapped (120) in a routing envelope and transmitted (124) electronically over a network.

Figure 6:
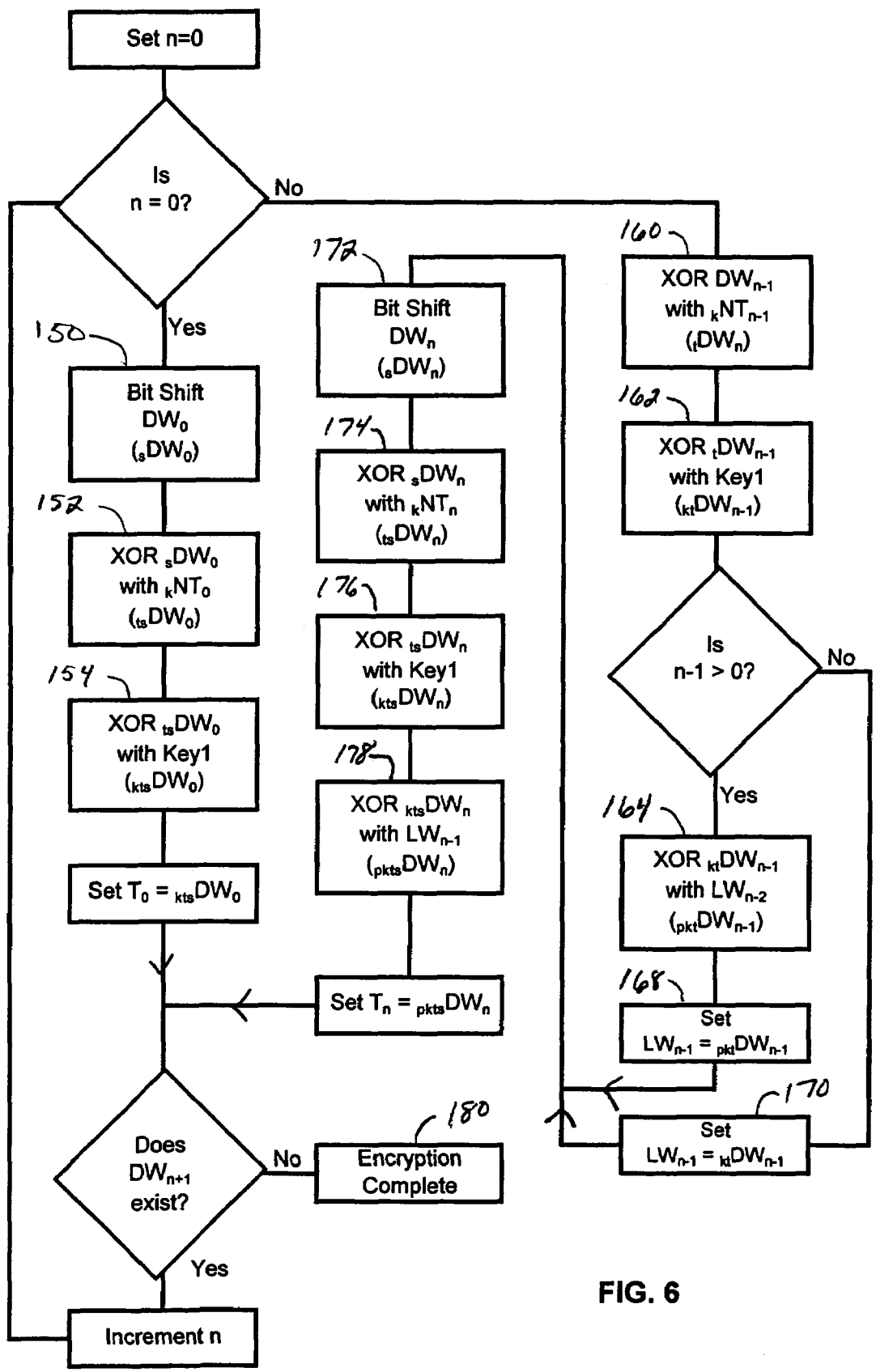
FIG. 6 is a flow chart illustrating a fourth method of encrypting.

FIG. 6 is a flow chart which details a method of performing the noise table and bit shifting encryption on the data part that is the second step of FIG. 5. The method of performing the noise table and bit shifting encryption on the header part, while not explicitly shown, is conducted in the same manner, with the difference being that the sender employs the semi-public noise table key and the semi-public noise table in lieu of the private noise table key and the private noise table, respectively. The nomenclature used in FIG. 6 is as follows:

n: a counter which identifies a specific data word as counted from the first data word, n=0;

$DW_n$: represents the $n^{th}$ data word in plain text;

$_sDW_n$: represents the $n^{th}$ data word that has been encoded with bit shifting as described above;

$_kNT_n$: represents the $n^{th}$ word of the private noise table that has been XOR encoded with the sender's private noise table key as described above;

$_tDW_n$: represents the $n^{th}$ data word that has been encoded with the sender's private noise table using the XOR operation;

Key1: the sender's private noise table key;

$_kDW_n$: represents the $n^{th}$ data word that has been encoded with the sender's private noise table key using the XOR operation;

$_pDW_n$: represents the $n^{th}$ data word that has been encoded with the last or previous word of XOR encoded data using the XOR operation;

$LW_n$: represents the $n^{th}$ data word (LW is short for Last Word) that has been XOR encoded as indicated; and $T_n$: represents the $n^{th}$ word of encrypted data that is ready for further processing prior to transmission.

In the nomenclature of FIG. 6, $DW_n$ may have one or more of the pre-subscripts defined above (p, k, t, and s). Each pre-subscript represents a single process performed on the data word. The order of the pre-subscripts represents the order in which the processes were performed. However, where two or more successive XOR operations are performed on a data word, the order in which the XOR operations are performed is irrelevant to the final result. Where more than one pre-subscript is shown, each process indicated has been performed on the data word. By way of example, $_{kts}DW_n$ indicates that the $n^{th}$ data word has been first encoded with bit shifting, then XOR encoded with the private noise table, then XOR encoded using the sender's private noise table key. Finally, where a step in the flow chart of FIG. 6 includes a parenthetical, the value within the parenthetical represents the result of the process performed in that step.

The data used Turning to the specifics of FIG. 6, the first data word, which is from the data as compressed in the first step of FIG. 5, occurs at n=0. This data word is encoded with bit shifting (150), encoded using the XOR operation with the sender's XOR encoded private noise table (152), and encoded using the XOR operation with the sender's private noise key (154). The resulting encrypted first data word is ready for further processing in the subsequent steps (134, 136) of FIG. 5.

The second and all subsequent data words are processed in the same manner. Before each subsequent data word, $DW_n$, is encoded, the last encoded data word, $LW_{n-1}$, is determined (168, 170). For the second data word, n=1, the last encoded data word, $LW_0$, is set (170) to the result of XOR encoding the previous data word, $DW_{n-1}$, with the corresponding noise table word (160) and then with the sender's private noise table key (162). For all data words following the second data word, n>1, the last encoded data word, $LW_{n-1}$, is set (168) to the result of XOR encoding the previous data word, $DW_{n-1}$, with the corresponding noise table word (160), then with the sender's private noise table key (162), and finally with the immediately previous last encoded data word, $LW_{n-2}$ (164).

With the last encoded data word, $LW_{n-1}$, determined (168, 170), each subsequent data word, $DW_n$, may be encoded. All subsequent data words are encoded with bit shifting (172), encoded using the XOR operation with the sender's XOR encoded private noise table (174), encoded using the XOR operation with the sender's private noise table key (176), and encoded using the XOR operation with the last encoded data word, $LW_{n-1}$. Each resulting encrypted data word is ready for further processing in the subsequent steps (134, 136) of FIG. 5. After all data words have been encrypted, this step of the encryption process is complete (180).

Figure 7:
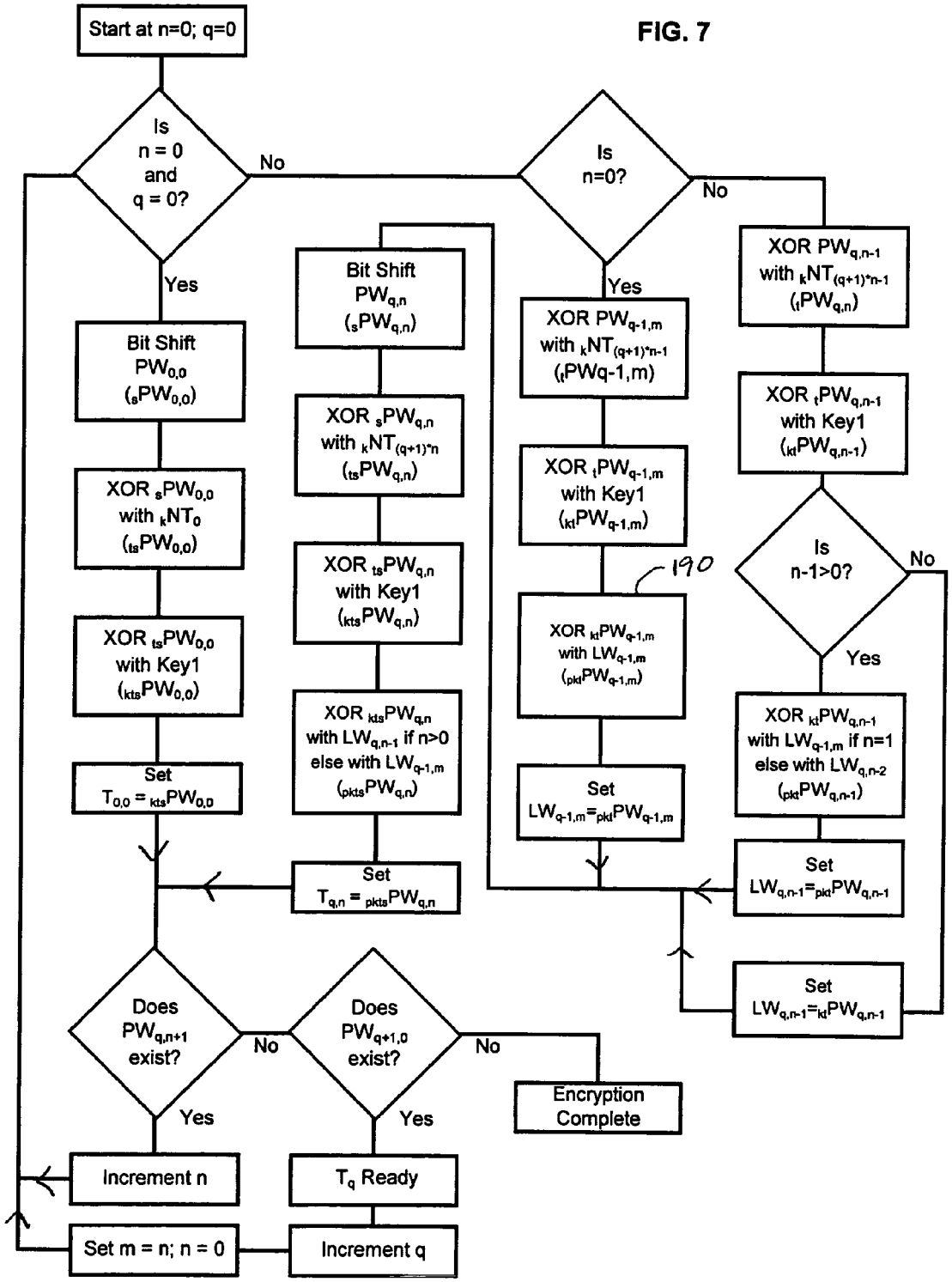
FIG. 7 is a flow chart illustrating a method of transmitting data in packets.

FIG. 7 shows how the encryption process of FIG. 6 may be adapted for use with streaming data packets. The nomenclature used in FIG. 7 is similar to that used in FIG. 6, with the following additions/changes:

q: a counter which identifies a specific data packet as counted from the first data packet, q=0;

m: a number which identifies the total number of data words in a data packet;

$PW_{q,n}$: represents the $n^{th}$ data word in the $q^{th}$ packet in plain text;

$_sPW_{q,n}$: represents the $n^{th}$ data word in the $q^{th}$ packet that has been encoded with bit shifting as described above;

$_kNT_n$: represents the $n^{th}$ word of the private noise table that has been XOR encoded with the sender's private noise table key as described above;

$_tPW_{q,n}$: represents the $n^{th}$ data word in the $q^{th}$ packet that has been encoded with the sender's private noise table using the XOR operation;

$_kPW_{q,n}$: represents the $n^{th}$ data word in the $q^{th}$ packet that has been encoded with the sender's private noise table key using the XOR operation;

$_pPW_{q,n}$: represents the $n^{th}$ data word in the $q^{th}$ packet that has been encoded with the last or previous word of XOR encoded data using the XOR operation;

$LW_{q,n}$: represents the $n^{th}$ data word in the $q^{th}$ packet that has been XOR encoded as indicated;

$T_{q,n}$: represents the $n^{th}$ word in the $q^{th}$ packet of encrypted data; and $T_q$: represents the $q^{th}$ packet of encrypted data that is ready for further processing prior to transmission.

The process of encrypting each word in a series of data packets is similar to the process of FIG. 6. The preferred packet size is 8 kilobytes, and this size may vary as desired or appropriate for a given network or protocol. For encrypting data in packets, the first data word, $PW_{q,0}$, of all data packets for q>0, is XOR encoded (190) using the last encoded data word from the previous packet, $LW_{q-1,m}$, m representing the last word of the previous data packet. All other data words of each data packet is encoded in the same manner as shown in FIG. 6.

5. Systems for Sending Encrypted Transmissions

As used herein the term "computer" refers to any programmable processor which is connectable to a network by those skilled in the art, such as a personal computing device, whether networkable wirelessly or with a physical connection, a network enabled personal digital assistant, a cellular phone having a network connection, and the like. Further, the network or any network connection between two networked components may be hard wired or wireless.

Figure 8:
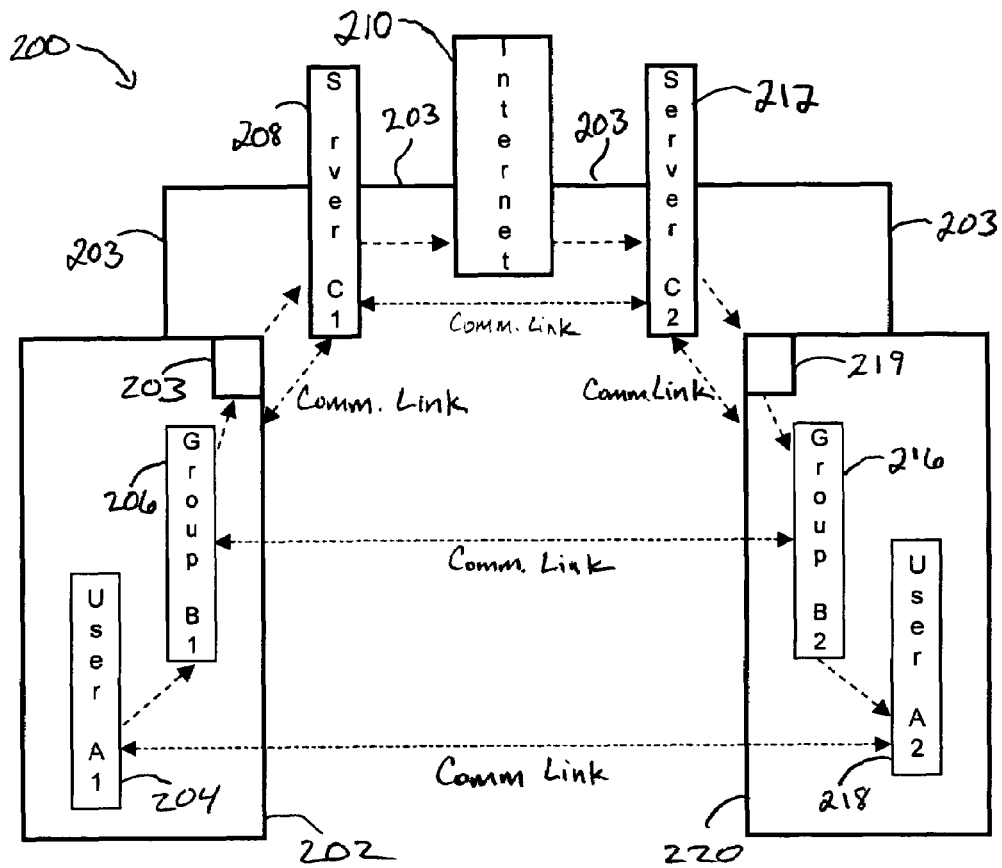
FIG. 8 schematically illustrates a system for encrypting data transmissions.

FIG. 8 schematically illustrates a system 200 in which the above encryption processes are implemented. The first and second computers 202, 220 communicate via the network 203. The first computer 202 has a direct network connection to the first server 208. All network transmissions to and from the first computer 202 pass through the first computer's transport daemon 203. The first server 208 has a network connection to the Internet 210. Similarly, the second computer 220 has a direct network connection to the second server 212. All network transmissions to and from the second computer 220 pass through the second computer's transport daemon 219. The second server 212 also has a network connection to the Internet 210. Each element of the network, namely the first and second computers 202, 220 and the first and second servers 208, 212, is thus communicably connected to each other element of the network. Each element is also communicably connected to other Internet connected devices and computers via the network connection with the Internet. At the minimum, however, the two computers 202, 220 need only be communicably connected to each other via a network.

The first and second computers 202, 220 host both user and group processes. A user process and its related group process need not be hosted on the same computer. The user processes 204, 218 are initiated directly or indirectly by users of the computer. Similarly, the group processes 206, 216 are initiated either directly or indirectly by a user who is a member of the group to which the process belongs. Alternatively, the user and group processes may be hosted on different computers. Generally, each user belongs to at least one group within the local network environment, and each group typically includes a plurality of users. As in many network computing environments, a single computer may host a plurality of users and user processes in addition to a plurality of groups and group processes. Those skilled in the art will recognize that networked systems are generally very flexible and scalable, with many different configurations being possible. FIG. 8, therefore, is only one example of how a system for transmitting encrypted data may be configured.

In FIG. 8, User A2 is the intended recipient and final destination of the encrypted transmission from User A1. Those communication parameters defining how the transmission is to be encrypted and enabling the encryption are established, preferably by User A2, and provided to User A1 at some time prior to the transmission. User A1 establishes the remaining communication parameters, as indicated above, at the time the transmission is encrypted and sent.

As the originator and the recipient of the encrypted transmission, Users A1 and A2 are referred to as the originating node and terminating node, respectively, of a communication link. The originating node of a communication link is the process, user, group, server, transport daemon, computer, or the like which encrypted a header part for an intended recipient, and the terminating node, which may be a process, user, group, server, transport daemon, computer, or the like, that is the intended recipient.

In FIG. 8, the first user process 204 generates the encrypted transmission to the second user process 218. The first user process 204 encrypts the data part and the header part of the transmission for the second user process 218 as the intended recipient. The two user processes 204, 218 thus form a single communication link for this transmission. Further, as the originator of the data part and the intended recipient of the data part, the two user processes 204, 218 form the lowest level communication link, within which other communication links may be embedded. FIG. 9A schematically illustrates the transmission as it is generated and transmitted from the first user process 204. The transmission includes a data part 230, a header part 232, and a routing envelope 234, as is schematically shown in FIG. 9A.

The first user process 204 encrypts the data part 230 of the transmission using the first key part of the first encryption key, the identified encryption algorithm, the identified compression algorithm, the private reference table, the private noise-table key, and the private noise table, as described above, all being associated with the second user process 218. The first user process 204 encrypts the header part using the first key part of the second encryption key, the identified encryption algorithm, the identified compression algorithm, the semi-public reference table, the semi-public noise table key, and the semi-public noise table, as described above, all being associated with the second user process 218. Thus, so long as the private communication parameters remain private, only the second user process 218 may decrypt both parts of the transmission. Further, while the encryption may be broken, those of skill in the art will recognize that such is not easily done.

The routing envelope 234 of the transmission, as constructed by the first user process 204, includes the identity of the intended recipient at the terminating node of the communication link being established, in this case the second user process 218, the identity of the next recipient of the transmission on the network, in this case the first group process 206, the network port identifier generated by the first user process 218, and any other information necessary to satisfy the network protocol employed for the transmission. Preferably, the first user process 204 routes the transmission blindly to the intended recipient. In other words, the routing envelope does not include the sender's identity and the sender does not expect a verification receipt for the transmission, either from the recipient or from intervening servers. The sender's identity may, however, be included within the routing envelope if desired or necessary to meet the network protocol employed.

The first user process 204 routes the transmission through the first group process 206, which in turn reroutes the transmission because it is not the intended recipient. Preferably, transmissions from a user process always pass through a group processor to help maintain the privacy of the originator and the intended recipient of the transmission. In rerouting the transmission, the first group process 206 is the originating node of a second communication link, while the second group process 216 is the terminating node the second communication link. This second communication link is wholly embedded within the first communication link.

Figure 10:
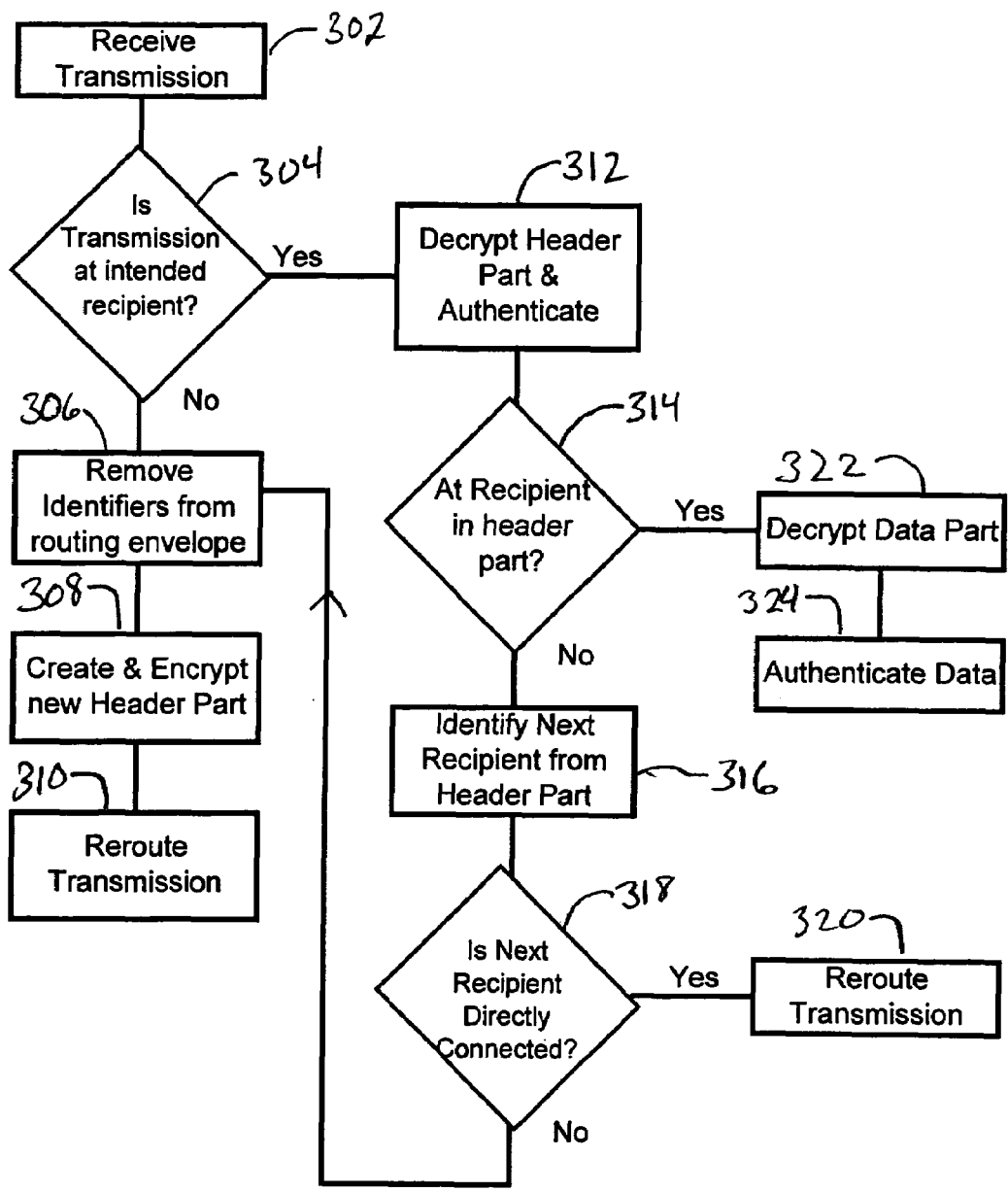
FIG. 10 is a flow chart illustrating a method of routing data transmissions.

FIG. 10 illustrates the process of receiving a transmission, whether by an originating node of an upper level communication link, at a terminating node that is not the final destination, or at the terminating node that is the final destination, and rerouting the transmission when appropriate. Upon receipt (302) of the transmission from the first user process 204, the first group process 206 determines (304) whether the transmission is to be rerouted or if the first group process 206 is the intended recipient. This determination is based upon the information in the routing envelope. Where the transmission is received at a terminating node, this determination is also based upon information included in the header part. For the transmission from the first user process 204, the routing envelope identifies the second user process 218 is the intended recipient, thereby indicating that the first group process 206 is to reroute the transmission.

The first group process 206 removes (306) from the routing envelope all references identifying the first user process 204 as the originator of the transmission, identifying the second user process 218 as the final destination of the transmission, and the network port identifier generated by the first user process 204. Further, the first group process 206 adds to the routing envelope the identity of the second group process 216 as the intended recipient, the identity of the first computer 202 as the identity of the next recipient of the transmission, and a network port identifier based upon the communication parameters established between the first and second group processes 206, 216. The first computer 202 includes a transport daemon 203 which manages such transmissions for the computer. The first group process 206 also adds (308) a second header part 236, which is schematically shown in FIG. 9B, in an encrypted format to the transmission. This second header part 236 includes two sub-parts that are separately encrypted as described in connection with FIGS. 5 and 6. The communication parameters used to encrypt the second header part 236 are established between the first group process 206 and the second group process 216, and therefore will likely be different than the communication parameters established between the first and second user processes 204, 218.

The first sub-part of the second header part 236 includes at least the identity of the second user process 218 as the final destination, the network port identifier generated by the first user process 204, the identity of the group process 206 as the originator of the transmission within the second communication link, a message number, a date and time identifier, a port offset identifier, and a date and time of the transmission (if different from the date and time identifier), all based upon the communication parameters established between the first group process 206 and the second group process 216. The first sub-part of the second header part 236 may also include other information.

The first sub-part of the second header part 236 is encrypted using the first key part of the first encryption key, the identified encryption algorithm, the identified compression algorithm, a private reference table, the first private noise table key, and the private noise table, as described above, all being associated with or part of the communication parameters established between the first and second group processes 206, 216. Thus, so long as the communication parameters remain private, only the second group process 216 may decrypt the first sub-part of the second header part of the transmission.

The second sub-part of the second header part 236 includes at least the identity of the originating node for the current communication link, in this case the first group process 206 and the message number, the date and time identifier, the port offset identifier, and the date and time of the transmission, each as included in the first sub-part of the second header part 236. The second sub-part of the second header part 236 may also include other information. The second sub-part of the second header part 236 is encrypted using the first key part of the second encryption key, the identified encryption algorithm, the identified compression algorithm, the semi-public reference table, the semi-public noise table key, and the semi-public noise table, as described above, all being associated with or part of the communication parameters established between the first and second group processes 206, 216. Thus, so long as the communication parameters remain private, only the second group process 216 may decrypt the second header part of the transmission. Further, the identities of the first and second user processes 204, 218, as the originator of and the final destination of the transmission, respectively, are maintained private at all network points between the first group process 206 and the group process 208 of the second communication link. The privacy of the originating and recipient parties is maintained unless the encryption is intentionally broken or the privacy of the communication parameters are compromised.

In the system of FIG. 8, the group processes 206, 216 have no direct network connection between them and neither is connected to the Internet 210. The first group process 206 thus can not reroute the transmission directly to the second group process 216. The first group process 206 therefore reroutes the transmission to the computer level of the first computer 202, where the transport daemon 203 manages the transmission for the first computer 202. Because communication parameters have been established between the first computer 202 and the first server 208, the transport daemon 203 in turn reroutes the transmission to the first server 208 by establishing a third communication link. This communication link has the first computer 202 as its originating node and the first server 208 as its terminating node.

The process by which the transport daemon 203 reroutes the transmission to the first server 208 is nearly the same as the process described in connection with rerouting by the first group process 206 above. The difference between the processes lies in the communication parameters. Where the first group process 206 uses communication parameters associated with the second group process 216, the transport daemon 203 likewise uses communication parameters associated with the first server 208.

The routing envelope of the transmission from the first group process 206 identifies the second group process 216 as the intended recipient, thereby indicating that the transport daemon 203 is to reroute the transmission, and includes the network port identifier generated by the first group process 206. The transport daemon 203 removes from the routing envelope all references identifying the first and second group processes 206, 216 as the originating and terminating nodes, respectively, of the second communication link and the network port identifier generated by the first group process 206. The transport daemon 203 adds to the routing envelope the identity of the first server 208 as both the intended recipient and the next recipient of the transmission a network port identifier based upon the communication parameters established between the first computer 202 and the first server 208. The transport daemon 203 also adds a third header part 238 in an encrypted format, schematically shown in FIG. 9C, to the transmission. This third header part 238 includes two sub-parts that are separately encrypted as described in connection with FIGS. 5 and 6. The communication parameters used to encrypt the third header part 238 are established between the first server 208 and the second server 212, and therefore will likely be different than the communication parameters established between the first and second user processes 204, 218 and those between the first and second group processes 206, 216.

Similar to the second header part, the first sub-part of the third header part 238 includes at least the identity of the second group process 216 as the destination of the transmission within the immediately lower level communication link, the network port identifier as generated by the originating node of the next lower communication link, at this point the first group process 206, the identity of the first computer 202 as the originator of the transmission within the third communication link, a message number, a date and time identifier, a port offset identifier, and a date and time of the transmission (if different from the date and time identifier), all based upon the communication parameters established between the first computer 202 and the first server 208. The first sub-part of the third header part 238 may also include other information.

The first sub-part of the third header part 238 is encrypted using the first key part of the first encryption key, the identified encryption algorithm, the identified compression algorithm, a private reference table, the first private noise table key, and the private noise table, as described above, all being associated with or part of the communication parameters established between the first computer 202 and the first server 208. Thus, so long as the communication parameters remain private, only the first server 208 may decrypt the first sub-part of the second header part of the transmission.

The second sub-part of the third header part 238 includes at least the identity of the originating node for the current communication link, in this case the first computer 202 and the message number, the date and time identifier, the port offset identifier, and the date and time of the transmission, each as included in the first sub-part of the third header part 238. The second sub-part of the third header part 238 may also include other information. The second sub-part of the third header part 238 is encrypted using the first key part of the second encryption key, the identified encryption algorithm, the identified compression algorithm, a semi-public reference table, the semi-public noise table key, and the semi-public noise table, as described above, all being associated with or part of the communication parameters established between the first and second servers 208, 212. Thus, so long as the communication parameters remain private, only the first server 208 may decrypt second sub-part of the third header part 238 of the transmission. Further, the identities of the first and second group processes 206, 216, as the originating and terminating nodes, respectively, of the next lower communication link are maintained private at all network and Internet points between the first computer 202 and the first server 208. The privacy of the lower communication link nodes is thus maintained for all purposes short of the encryption being intentionally broken.

The transmission as formed by the above processes is routed to the network port of the first server 208 as indicated by the network port identifier included in the routing envelope (which was generated by the transport daemon 203 of the first computer 202). Referring to FIGS. 8 and 10, the first server 208, being the terminating node of the third communication link, receives (302) the transmission. The routing envelope of the transmission indicates (304) that the first server 208 is both the next recipient and the intended recipient of the transmission, therefore, the first server 208 decrypts (312) the second sub-part of the third header part 238 to authenticate the transmission and determine how to further process the transmission. The second sub-part of the third header part 238 is decrypted using the second key part of the second encryption key, the identified encryption algorithm, the identified compression algorithm, the third private noise table key, the semi-public noise table, and the semi-public reference table, all being associated with or part of the communication parameters established between the first computer 202 and the first server 208, all being utilized as described above.

The decoded information contained within the second sub-part of the third header part 238 identifies the first computer 202 as the originating node of the present communication link and provides the message number, the port offset indicator, and the date and time identifier as generated by the transport daemon 203 of the first computer 202. The information in the second sub-part of the second header part 236 is used to authenticate the transmission as having originated from the first group process 206. The message number from the third header part is compared against the message number expected by the first server 208 in the next transmission from the first computer 202. The message number is used to identify one of the port numbers within the list of port numbers that is part of the communication parameters established between the first computer 202 and the first server 208. If the sum of this identified port number and the port offset indicator is the same as the network port through which the transmission arrived, the transmission is further verified as having originated with the first computer 202. Finally, the date and time stamp from the third header part 238 is examined to ensure the transmission was delivered in a timely manner. Significant delays in the delivery time of the transmission may serve as an indicator that the transmission is either not authentic or was tampered with prior to delivery.

Having authenticated the transmission, the first sub-part of the third header part 238 is decoded to determine how to further process the transmission. With the identity of the originating node identified and using the other information obtained from the second sub-part of the third header part 238, the first server 208 decrypts the first sub-part of the third header part 238 using the first key part of the first encryption key, the identified encryption algorithm, the identified compression algorithm, a private reference table, the second private noise table key, and the private noise table, as described above, all being associated with or part of the communication parameters established between the first computer 202 and the first server 208.

The decoded information in the third header part 238 indicates that the first server 208 is not the intended recipient (314) of the data part and also indicates that the second group process 216 is the next intended recipient (316) of the transmission. The first server 208 therefore prepares to reroute the transmission according to the information included in the first sub-part of the third header part 238. recognizing (318) that the intended recipient identified in the third header part 238 is a group process to which the first server 208 does not have a direct network link, the first server 208 reroutes the transmission to the second server 212.

The process by which the first server 208 reroutes the transmission to the second server 212 is nearly the same as the process by which the transport daemon 203 of the first computer 202 reroutes the transmission, the difference being in the communication parameters used. FIG. 9D schematically illustrates the transmission between the first and second servers 208, 212, with the fourth header part 240 added by the first server 208.

Upon receipt of the transmission at the second server 212, both sub-parts of the fourth header part, encrypted by the first server 208, are decrypted in the manner previously described in connection with the third header part 238. The decoded information from the fourth header part indicates that the second group process 216 is the next intended recipient of the transmission and the second server 212 recognizes that the second group process 216 resides on the computer 220 to which the second server 212 has a direct network link. The second server 212 therefore reroutes the transmission to the second computer 220, the second server 212 forming the originating node of a fifth communication link and the second computer 220 being the terminating node. The transmission between the second server 212 and the second computer 220 is performed like the other communication links, with the communication parameters being established between the nodes of the communication link and a new header part being added to the transmission.

The transport daemon 219 of the second computer receives and processes the transmission from the second server 212. Decryption of the header part associated with this fifth communication link proceeds in a manner similar to that described in association with the third communication link, the difference being that the communication parameters established between the second server 212 and the second computer 220 are used in the decryption process. The information included in this header part indicates that the second computer 220 is not the intended recipient and that the second group process 216 is the intended recipient or terminating node of the next lower communication link. The transport daemon therefore routes (320) the transmission to the second group process 216 by removing previous information from the routing envelope and inserting into the routing envelope the identity of the second group process 216 as the intended recipient and the network port identifier as obtained from the just decoded header part, which at this point is the network port identifier generated by the first group process 208. The transmission is thus delivered to the second group process 216 via the network port established by the first group process 206.

The second group process 216 processes the transmission in a similar manner. The second group process 216, being the terminating node of the second communication link, receives (302) the transmission. The routing envelope of the transmission indicates (304) that the second group process 216 is the intended recipient of the transmission, therefore, the second group process 216 decrypts (312) the first and second sub-parts of the second header part 236 to authenticate the transmission and determine how to further process the transmission. The second sub-part of the second header part 236 is decrypted using the second key part of the second encryption key, the identified encryption algorithm, the identified compression algorithm, the third private noise table key, the semi-public noise table, and the semi-public reference table, all being associated with or part of the communication parameters established between the first and second group processes 206, 216, all being utilized as described above.

The decoded information contained within the second sub-part of the second header part 236 identifies the first group process 206 as the originating node of the communication link and provides the message number, the port offset indicator, and the date and time identifier as generated by the first group process 206. The information in the second sub-part of the second header part 236 is used to authenticate the transmission as having originated from the first group process 206. The message number is compared against the message number expected by the second group process 216 in the next transmission from the first group process 206. The message number is used to identify one of the port numbers within the list of port numbers established as part of the communication parameters between the first and second group processes 206, 216. If the sum of this identified port number and the port offset indicator is the same as the network port through which the transmission arrived, the transmission is further verified as having originated with the first group process 206. Finally, the date and time stamp from the second header part 236 is examined to ensure the transmission was delivered in a timely manner. Significant delays in the delivery time of the transmission may serve as an indicator that the transmission is either not authentic or was tampered with prior to delivery.

Having authenticated the transmission the first sub-part of the second header part 236 is decoded to determine how to further process the transmission. With the identity of the originating node identified and using the other information obtained from the second sub-part of the second header part 236, the second group process 216 decodes the first sub-part of the second header part 236 using the first key part of the first encryption key, the identified encryption algorithm, the identified compression algorithm, a private reference table, the second private noise table key, and the private noise table, as described above, all being associated with or part of the communication parameters established between the first and second group processes 206, 216.

The decoded information in the second header part 236 indicates that the second group process 216 is not the intended recipient (314) of the data part, while also indicating that the second user process 218 is the next intended recipient (316) of the transmission. The second group process 216 therefore prepares to reroute the transmission according to the information included in the first sub-part of the second header part 236. Recognizing (318) that the intended recipient identified in the second header part 236 is a user process residing within the same computer 220, the second group process 216 routes (320) the transmission to the second user process 218 by removing previous information from the routing envelope and inserting into the routing envelope the identity of the second user process 218 as the next intended recipient and the network port identifier as obtained from the second header part 236, namely the network port identifier generated by the first user process 202. The transmission is thus delivered to the second user process 218 via the network port established by the first user process 204.

The second user process 218 also processes the transmission similarly. The second user process 218, being the terminating node of the first communication link, receives (302) the transmission. The routing envelope of the transmission indicates (304) that the second user process 218 is the recipient of the transmission, therefore, the second user process 218 decrypts (312) the first header part 232 (which does not have sub-parts) to authenticate the transmission and determine how to further process the transmission. The first header part 232 is decrypted (312) using the second key part of the second encryption key, the identified encryption algorithm, the identified compression algorithm, the third private noise table key, the semi-public noise table, and the semi-public reference table, all being associated with or part of the communication parameters established between the first and second user processes 204, 218, all being utilized as described above.

The decoded information contained within the first header part 232, namely the message number, the port offset indicator, the date and time identifier, and the identity of the first user process 204 as the originating node of the first communication link, are used to authenticate the message as having originated from the first user process 204. The message number from the first header part 232 is compared against the message number expected by the second user process 218 in the next transmission from the first user process 204. The message number is used to identify one of the port numbers within the list of port numbers established as part of the communication parameters between the first and second user processes 204, 218. If the sum of this identified port number and the port offset indicator is the same as the network port through which the transmission arrived, the transmission is further verified as having originated with the first user process 204. Finally, the date and time stamp from the second header part 236 is examined to ensure the transmission was delivered in a timely manner. Significant delays in the delivery time of the transmission may serve as an indicator that the transmission is either not authentic or was tampered with prior to delivery.

Having authenticated the transmission, the second user process 218 determines (314) that it is the intended recipient of the data part 230 of the transmission. The second user process 218 therefore proceeds to decrypt (322) the data part 230 of the transmission using the second key part of the first encryption key, the identified encryption algorithm, the identified compression algorithm, the second private noise table key, the private noise table, and the private reference table, all being associated with or part of the communication parameters established between the first and second user processes 204, 218. The authenticity of the transmission is again verified (324). The message number, the port offset identifier, the time and date identifier, the identity of the sender, and the date and time stamp included in the header part of the transmission is compared to the same information included in the data part of the transmission for further authentication.

Figure 11:
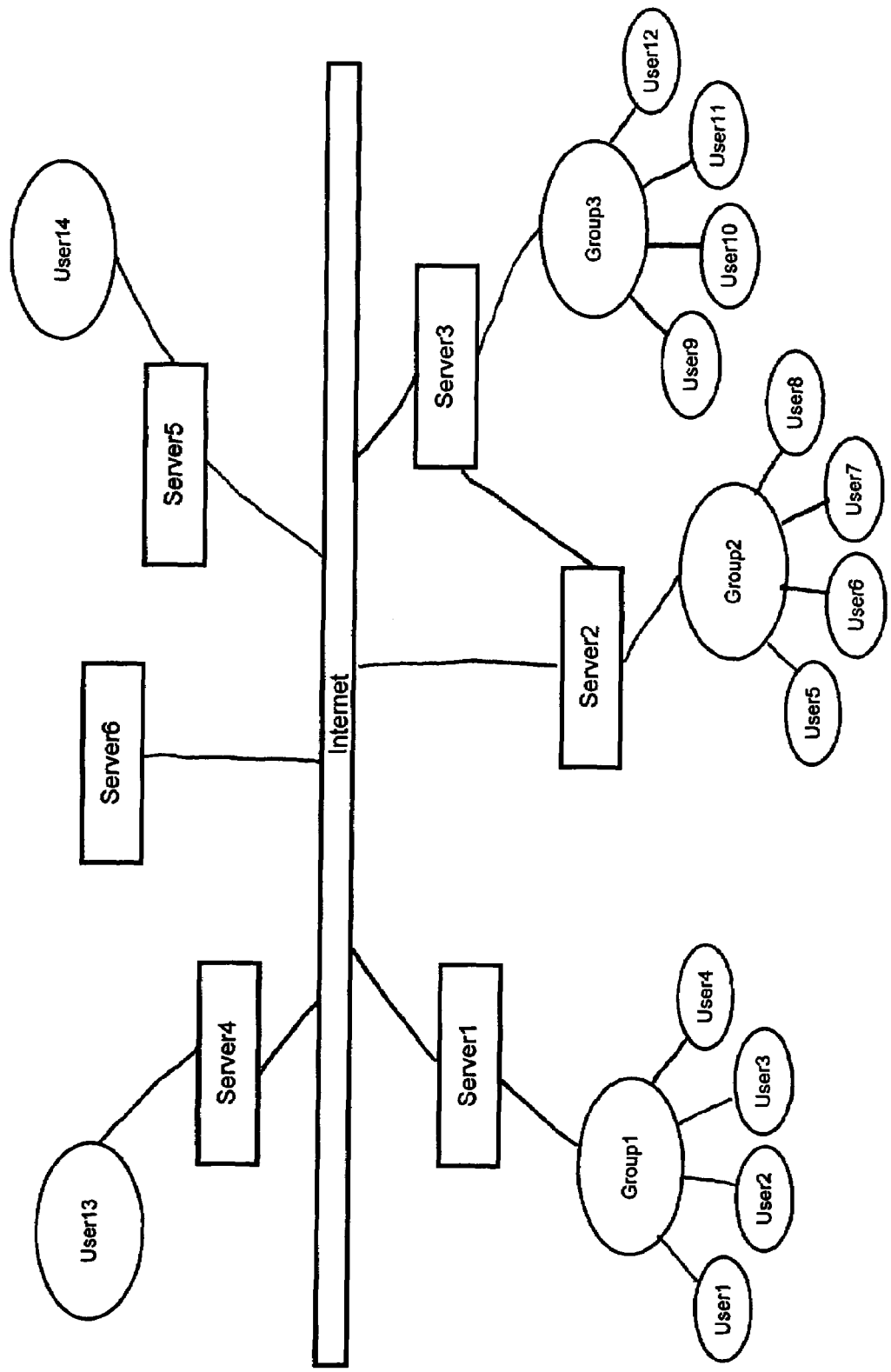
FIG. 11 schematically illustrates a plurality of networked systems for encrypting data transmissions.

FIG. 11 illustrates some of the many different configurations possible for the system previously described. The system of FIG. 8 is schematically illustrated where the originating and terminating nodes of a lowest level (or first) communication link are User4 and User5, respectively, the originating and terminating nodes of a second communication link are Group1 and Group2, respectively, and the originating and terminating nodes of a third communication link are Server1 and Server2, respectively. Another configuration may include Server2 and Server3, where these two servers form a communication link and the two nodes are directly linked by a network connection. Yet another configuration may include User13 and User14 as the originating and terminating nodes, respectively, of a first communication link and Server4 and Server5 as the originating and terminating nodes of a second communication link. In sum, any single networkable computer may serve as an originating node, a terminating node, or both, as described below, for sending encrypted transmissions. Where the appropriate communication parameters have been established between two devices that are connected via a network, the sending device is established as the originating node of a communication link and the intended receiving device as the terminating node.

In yet another configuration of the system previously described, a single computer may host both the terminating node of a first communication link and the originating node of the next communication link. Further, the two nodes may be represented by a single user, group, or server process. By way of example, User13 and User14 may be the originating and terminating nodes, respectively, of a first communication link, Server4 and Server6 may be the originating and terminating nodes, respectively, of a second communication link, and Server6 and Server5 may be the originating and terminating nodes, respectively, of a third communication link.

In this configuration, Server6 is both the terminating node of the second communication link and the originating node of the third communication link. Server6 processes and reroutes an incoming transmission from Server4 in much the same manner as previously described. Referring to FIG. 10, Server6 receives (302) a transmission as the terminating node of the second communication link. The routing envelope of the transmission indicates (304) that Server6 is the recipient of the transmission, therefore, the Server6 decrypts (312) the second header part to authenticate the transmission and determine how to further process the transmission. The second header part is decrypted (312) using the communication parameters established between Server4 and Server6.

The decoded information contained within the second header part, namely the message number, the port offset indicator, the date and time identifier, and the identity of Server4 as the originating node of the second communication link, are used to authenticate the message as having originated from Server4 in the manner previously described. Having authenticated the transmission, Server6 prepares to reroute the transmission according to the information included in the second header part. The decoded information in the second header part indicates that Server6 is not the intended recipient (314) of the data part, while also indicating that User14 is the next intended recipient (316) of the transmission. Further, determining (318) that it not having a direct network connection to User14, Server6 prepares to reroute the transmission as the originating node of the third communication link. Server6 removes (306) the appropriate information from the routing envelope and inserts new information therein for current routing in the manner previously described. Server6 also adds (308) a third header part 240 in the manner previously described. With the transmission processed thusly, Server6 reroutes the transmission to Server5 as the terminating node of the third communication link. As before, the privacy of the originating and recipient parties is maintained for all purposes short of the encryption being intentionally broken.

Importantly, the multitude of communication links illustrated by FIG. 11 are not limited to communicating using the encryption methods described herein when establishing the originating and terminating nodes of a communication link. Any encryption algorithm or combination of algorithms may be employed to encrypt data transmissions between the nodes.

Thus, a method of encrypting and transmitting data and a system for transmitting encrypted data are disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A method of encrypting data comprising:
   representing the data in binary format having words of X bits in length;
   using a computer to perform a first reversible rearrangement of the order of the bits of each word of the data utilizing a reference table; and
   using the computer to perform a second reversible rearrangement of the order of the bits of each word of the data utilizing the reference table,
   and the method further including using the computer to generate the reference table before representing the data in binary format, the reference table having a first row of m entries and r rows of n entries each, wherein m, n, and r are prime numbers.

2. A method of encrypting data comprising:
   using a computer to represent the data in binary format having words of X bits in length;
   using a computer to perform a first reversible rearrangement of the order of the bits of each word of the data utilizing a reference table; and
   using a computer to perform a second reversible rearrangement of the order of the bits of each word of the data utilizing the reference table,
   and the method further including using the computer to generate the reference table before representing the data in binary format, the reference table having a first row of m entries and r rows of n entries each,
   wherein generating the reference table further includes using the computer to assign numbers to the entries of the reference table, one number per entry, wherein the number assigned to each entry in the first row is unique within the first row and the number assigned to each entry in each of the r rows is unique within each respective row, and
   wherein performing the first reversible rearrangement of the order of the bits in each word of the data comprises using the computer to:
   group each word of the data into m groups of bits;
   arrange the numbers from the first row of the table into numerical order;
   correlate each of the groups of bits with one of the numbers from the first row of the table as arranged in numerical order; and
   rearrange the groups of bits based upon the numbers from the first row of the table as ordered in the first row of the table, and
   wherein grouping each word of the data into m groups of bits includes using the computer to group each word of the data into m−1 groups of p bits in length and one group of q bits in length, q being less than p.

3. The method of claim 2, wherein performing the second reversible rearrangement of the order of the bits in each word of the data comprises using the computer to:
   group each word of the data into n groups of bits;
   arrange the numbers from one of the r rows of the table into numerical order;
   correlate each of the groups of bits with one of the numbers from the one of the r rows of the table as arranged in numerical order; and
   rearrange the groups of bits based upon the numbers from the one of the r rows of the table as ordered in the one of the r rows of the table, and
   wherein grouping each word of the data into n groups of bits includes using the computer to group each word of the data into n−1 groups of p bits in length and one group of q bits in length, q being less than p.

4. A method of encrypting data comprising:
   using a computer to represent the data in binary format having words of X bits in length;
   using the computer to perform an XOR operation on a first data word utilizing a key and a first noise table word from a noise table, wherein the noise table is represented in binary format having words of X bits in length and the key is represented in binary format having a word of X bits in length; and
   using the computer to perform the XOR operation on successive data words utilizing an immediately preceding XOR operation result and a subsequent noise table word,
   and the method further comprising using the computer to generate the noise table prior to representing the data in binary format, the noise table having a greater size than the data,
   wherein generating the noise table comprises using the computer to:
   obtain a data sample which is greater in size than the random character table;
   identify a data sub-sample within the data sample, the data sub-sample being equal in size to a random character table which is at least 128 bytes in size;
   represent the data sub-sample in words of X bits in length;
   perform a first rearrangement of the order of the bits in each word of the data sub-sample utilizing a reference table;

perform a second rearrangement of the order of the bits in each word of the data sub-sample utilizing the reference table; and perform successive XOR operations on each rearranged word of the data sub-sample, respectively, utilizing the random character table.

5. The method of claim 4, the method further comprising using the computer to generate the reference table, the reference table having a first row of m entries and r rows of n entries each, wherein m, n, and r are prime numbers.

6. The method of claim 4, the method further comprising using the computer to generate the reference table, the reference table having a first row of m entries and r rows of n entries each, wherein generating the reference table further includes using the computer to assign numbers to the entries of the reference table, one number per entry, wherein the number assigned to each entry in the first row is unique within the first row and the number assigned to each entry in each of the r rows is unique within each respective row, wherein performing the first reversible rearrangement of the order of the bits in each word of the data comprises using the computer to:

group each word of the data sub-sample into m groups of bits;

arrange the numbers from the first row of the table into numerical order;

correlate each of the groups of bits with one of the numbers from the first row of the table as arranged in numerical order; and rearrange the groups of bits based upon the numbers from the first row of the table as ordered in the first row of the table, wherein grouping each word of the data into m groups of bits includes using the computer to group each word of the data into m−1 groups of p bits in length and one group of q bits in length, q being less than p.

7. A The method of claim 4, the method further comprising using the computer to generate the reference table, the reference table having a first row of m entries and r rows of n entries each, wherein generating the reference table further includes using the computer to assign numbers to the entries of the reference table, one number per entry, wherein the number assigned to each entry in the first row is unique within the first row and the number assigned to each entry in each of the r rows is unique within each respective row, wherein performing the second reversible rearrangement of the order of the bits in each word of the data comprises using the computer to:

group each word of the data sub-sample into n groups of bits;

arrange the numbers from one of the r rows of the table into numerical order;

correlate each of the groups of bits with one of the numbers from the one of the r rows of the table as arranged in numerical order; and rearrange the groups of bits based upon the numbers from the one of the r rows of the table as ordered in the one of the r rows of the table, wherein grouping each word of the data into n groups of bits includes using the computer to group each word of the data into n−1 groups of p bits in length and one group of q bits in length, q being less than p.

8. A method of encrypting data comprising:

using a computer to represent the data in binary format having at least a first word and a second word, both of X bits in length;

using the computer to perform a first reversible rearrangement of the order of the bits of each word of the data utilizing a reference table;

using the computer to perform a second reversible rearrangement of the order of the bits of each word of the data utilizing the reference table, the first and second reversible rearrangements generating a first rearranged word and a second rearranged word;

using the computer to perform an XOR operation on the first rearranged word utilizing a key and a first noise table word from a noise table, wherein the noise table and the key are represented in binary format having words of X bits in length and the key is represented in binary format having a word of X bits in length; and using the computer to perform the XOR operation on a second rearranged word utilizing the key, a second noise table word subsequent to the first noise table word, and a result from performing the XOR operation on the first word utilizing the key and the first noise table word, and the method further including using the computer to generate the reference table before representing the data in binary format, the reference table having a first row of m entries and r rows of n entries each, wherein m, n, and r are prime numbers.

9. A method of encrypting data comprising:

using a computer to represent the data in binary format having at least a first word and a second word, both of X bits in length;

using the computer to perform a first reversible rearrangement of the order of the bits of each word of the data utilizing a reference table;

using the computer to perform a second reversible rearrangement of the order of the bits of each word of the data utilizing the reference table, the first and second reversible rearrangements generating a first rearranged word and a second rearranged word;

using the computer to perform an XOR operation on the first rearranged word utilizing a key and a first noise table word from a noise table, wherein the noise table and the key are represented in binary format having words of X bits in length and the key is represented in binary format having a word of X bits in length; and using the computer to perform the XOR operation on a second rearranged word utilizing the key, a second noise table word subsequent to the first noise table word, and a result from performing the XOR operation on the first word utilizing the key and the first noise table word, wherein the first word is formed by using the computer to perform the XOR operation on a time and date indicator utilizing at least a message number.

10. A method of transmitting encrypted data comprising:

using a computer to represent the data in binary format having at least a first word and a second word, both of X bits in length, the first word being formed by performing an XOR operation on a time and date indicator utilizing a message number and a port offset indicator, wherein the time and date indicator, the port offset indicator, and the message number are each represented in binary format having a word of X bits in length;

using the computer to perform the XOR operation on the first word utilizing a key and a first noise table word from a noise table to generate a first encrypted word, wherein the noise table is represented in binary format having words of X bits in length and the key is represented in binary format having a word of X bits in length;

using the computer to perform the XOR operation on the second data word utilizing the key, a second noise table word subsequent to the first noise table word, and the encrypted first word to generate a second encrypted word, the encrypted data comprising the first and second encrypted words; and transmitting the encrypted data.

11. The method of claim 10, the data in binary format including at least a third word of X bits in length, the method further comprising using the computer to perform the XOR operation on the third word utilizing the key, a third noise table word subsequent to the second noise table word, and the encrypted second word to generate an encrypted third word, the encrypted data further comprising the third encrypted word.

12. The method of claim 10, wherein prior to performing the XOR operation on the first word, the method further comprises using the computer to set the first noise table word as one of the words within the noise table.

13. The method of claim 10 further comprising using the computer to generate the noise table prior to representing the data in binary format, the noise table having a greater size than the data.

14. The method of claim 10 further comprising using the computer to utilize the message number to determine a first network port number within a list of network port numbers.

15. The method of claim 14, wherein transmitting the encrypted data includes transmitting the encrypted data within a routing envelope which indicates a second network port number, the port offset indicator representing an offset between the first and second network port numbers.

16. The method of claim 10, wherein transmitting the encrypted data includes wrapping the encrypted data in an encrypted header prior to transmission.

17. The method of claim 16, wherein wrapping the encrypted data in an encrypted header comprises:

assembling information to be placed in the encrypted header;

encrypting the information.

18. The method of claim 16, wherein the information includes the message number, the date and time indicator, an identity of an originator, and the port offset indicator.

19. The method of claim 10, wherein transmitting the encrypted data includes further encrypting the encrypted data utilizing a different encryption algorithm prior to transmission.

20. The method of claim 10 further comprising using the computer to perform a compression algorithm on the data prior to performing the first XOR operation.

21. The method of claim 10 further comprising using the computer to perform a compression algorithm on the data prior to transmitting the encrypted data.

22. A method of transmitting encrypted data comprising:

using the computer to represent the data in binary format having at least a first word and a second word, both of X bits in length, the first word being formed by performing an XOR operation on a time and date indicator utilizing a message number and a port offset indicator, wherein the time and date indicator, the port offset indicator, and the message number are each represented in binary format having a word of X bits in length;

using the computer to perform a first reversible rearrangement of the order of the bits of each word of the data utilizing a reference table; and using the computer to perform a second reversible rearrangement of the order of the bits of each word of the data utilizing the reference table, the first and second reversible rearrangements generating a first rearranged word and a second rearranged word from the first word and the second word, respectively;

using the computer to perform the XOR operation on the first rearranged word utilizing a key and a first noise table word from a noise table to generate a first encrypted word, wherein the noise table is represented in binary format having words of X bits in length and the key is represented in binary format having a word of X bits in length;

using the computer to perform the XOR operation on the second rearranged word utilizing the key, a second noise table word subsequent to the first noise table word and, a first result from performing the XOR operation on the first word utilizing the key and the first noise table word to generate a second encrypted word, the encrypted data comprising the first and second encrypted words; and transmitting the encrypted data.

23. The method of claim 22, wherein the data in binary format includes at least a third word of X bits in length and the first and second reversible rearrangements result in a third rearranged word, the method further comprising using the computer to perform the XOR operation on the third word utilizing the key, a third noise table word subsequent to the second noise table word, and a second result from performing the XOR operation on the second word utilizing the key, the second noise table word, and the first result to generate a third encrypted word, the encrypted data further comprising the third encrypted word.

24. The method of claim 22, wherein prior to performing the XOR operation on the first rearranged word, the method further comprises using the computer to set the first noise table word as one of the words within the noise table.

25. The method of claim 22 further comprising using the computer to generate the noise table prior to representing the data in binary format, the noise table having a greater size than the data.

26. The method of claim 22 further comprising using the computer to select the reference table from among a plurality of reference tables.

27. The method of claim 22, wherein the second reversible rearrangement is performed by the computer differently from the first reversible rearrangement.

28. The method of claim 22 further comprising the computer utilizing the message number to determine a first network port number within a list of network port numbers.

29. The method of claim 28, wherein transmitting the encrypted data includes transmitting the encrypted data within a routing envelope which indicates a second network port number, the port offset indicator representing an offset between the first and second network port numbers.

30. The method of claim 22, wherein transmitting the encrypted data includes wrapping the encrypted data in an encrypted header prior to transmission.

31. The method of claim 30, wherein wrapping the encrypted data in an encrypted header comprises:

assembling information to be placed in the encrypted header;

encrypting the information.

32. The method of claim 31, wherein the information includes the message number, the date and time indicator, an identity of an originator, and the port offset indicator.

33. The method of claim 22, wherein transmitting the encrypted data includes further encrypting the encrypted data utilizing a different encryption algorithm prior to transmission.

34. The method of claim 22 further comprising using the computer to perform a compression algorithm on the data prior to performing the first XOR operation.

35. The method of claim 22 further comprising using the computer to perform a compression algorithm on the data prior to transmitting the encrypted data.

36. A data transmission system comprising:
a first computer communicably connected to a network;
a second computer communicably connected to the network and configured to route a transmission to the first computer; and
a plurality of communication parameters including
a message number,
an encryption algorithm identifier,
a first encryption key comprising a first key part for encryption and a second key part for decryption, and
a second encryption key comprising a third key part for encryption and a fourth key part for decryption,
wherein the second computer is configured to (i) utilize the encryption algorithm identifier, the message number, and the first key part to encrypt a data part of the transmission to the first computer and (ii) utilize the encryption algorithm identifier and the third key part to encrypt a header part of the transmission, and
wherein the first computer is configured to (i) utilize the encryption algorithm identifier and the fourth key part to decrypt the header part and (ii) utilize the encryption algorithm identifier, the second key part, and the message number to decrypt the data part.

37. The system of claim 36, wherein the network comprises a wireless network.

38. The system of claim 36, wherein the message number is encrypted within the header part.

39. The system of claim 38, the communication parameters further including a plurality of private reference tables, wherein the second computer is configured to additionally utilize one of the private reference tables to encrypt the data part, and wherein the first computer is configured to additionally utilize the one of the private reference tables to decrypt the data part.

40. The system of claim 38, the communication parameters further including a plurality of semi-public reference tables, wherein the second computer is configured to additionally utilize one of the semi-public reference tables to encrypt the header part, and wherein the first computer is configured to additionally utilize the one of the semi-public reference tables to decrypt the header part.

41. The system of claim 36, the communication parameters further including:
a private noise table,
a first noise table key, and
a second noise table key,
wherein the second computer is configured to additionally utilize the private noise table and the first noise table key to encrypt the data part, and wherein the first computer is configured to additionally utilize the private noise table, the first noise table key, and the second noise table key to decrypt the data part.

42. The system of claim 41, wherein the first computer maintains the private noise table and the first noise table key in an encrypted format.

43. The system of claim 36, the communication parameters further including:
a semi-public noise table,
a semi-public noise table key, and
a private noise table key,
wherein the second computer is configured to additionally utilize the semi-public noise table and the semi-public noise table key to encrypt the header part, and wherein the first computer is configured to additionally utilize the semi-public noise table, the semi-public noise table key, and the private noise table key to decrypt the header part.

44. The system of claim 43, wherein the first computer maintains the semi-public noise table and the semi-public noise table key in an encrypted format.

45. The system of claim 36, the communication parameters further including a list of network ports, wherein the second computer is configured to additionally utilize the list of network ports to encrypt the data part and the header part, and wherein the first computer is configured to additionally utilize the list of network ports to decrypt the data part and the header part.

46. The system of claim 36, wherein the first computer is configured to establish the communication parameters.

* * * * *